United States Patent
Hosseini et al.

(10) Patent No.: US 12,041,622 B2
(45) Date of Patent: Jul. 16, 2024

(54) PHYSICAL DOWNLINK CONTROL CHANNEL MONITORING CAPABILITY REPORTING AND CONFIGURATION FOR DUAL CONNECTIVITY

(71) Applicant: QUALCOMM Incorporated, San Diego, CA (US)

(72) Inventors: Seyedkianoush Hosseini, San Diego, CA (US); Peter Gaal, San Diego, CA (US); Aamod Khandekar, San Diego, CA (US); James Beckman, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/302,825

(22) Filed: May 13, 2021

(65) Prior Publication Data
US 2021/0360593 A1   Nov. 18, 2021

Related U.S. Application Data

(60) Provisional application No. 63/025,704, filed on May 15, 2020.

(51) Int. Cl.
*H04W 72/04* (2023.01)
*H04W 72/23* (2023.01)
*H04W 76/15* (2018.01)

(52) U.S. Cl.
CPC ........... *H04W 72/23* (2023.01); *H04W 76/15* (2018.02)

(58) Field of Classification Search
CPC ....... H04W 72/23; H04W 76/15; H04W 8/24; H04W 24/08; H04L 5/0035; H04L 5/0053; H04L 5/0094; H04L 5/001
See application file for complete search history.

(56) References Cited

U.S. PATENT DOCUMENTS

| | | | |
|---|---|---|---|
| 10,951,359 B2* | 3/2021 | Huang | ................. H04L 5/0094 |
| 2020/0092073 A1* | 3/2020 | Papasakellariou | .... H04L 5/0053 |

(Continued)

FOREIGN PATENT DOCUMENTS

| | | |
|---|---|---|
| CN | 107925529 A | 4/2018 |
| EP | 3726904 A1 | 10/2020 |

(Continued)

OTHER PUBLICATIONS

3GPP TS 38.213: "3rd Generation Partnership Project, Technical Specification Group Radio Access Network, NR, Physical Layer Procedures for Control (Release 16)", 3GPP TS 38.213, V16.1.0, Apr. 3, 2020 (Apr. 3, 2020), 3rd Generation Partnership Project (3GPP), Mobile Competence Centre, 650, Route Des Lucioles, F-06921 Sophia-Antipolis Cedex, France, vol. RAN WG1. No. V16.1.0, Apr. 3, 2020 (Apr. 3, 2020), XP051893821, pp. 1-156, , Retrieved from the Internet: URL:http://ftp.3gpp.org/Specs/archive/38_series/38.213/38213-g10.zip 38213-g10.docx [retrieved on Apr. 3, 2020] p. 17, line 3-p. 18, line 8, paragraph [0010], Section 9.

(Continued)

*Primary Examiner* — Hoang-Chuong Q Vu
(74) *Attorney, Agent, or Firm* — QUALCOMM IP DEPT.; James Hunt Yancey, Jr.

(57) ABSTRACT

Various aspects of the present disclosure generally relate to wireless communication. In some aspects, a user equipment (UE) may transmit, to a base station, for a master cell group and a secondary cell group used for a dual connectivity mode of the UE, information indicating physical downlink control channel (PDCCH) monitoring capability values for one or more of span-based monitoring or a combination of slot-based monitoring and span-based monitoring. The UE may receive, from the base station, PDCCH monitoring configuration values for the MCG and the SCG based at least (Continued)

in part on the PDCCH monitoring capability values. Numerous other aspects are provided.

56 Claims, 7 Drawing Sheets

(56) References Cited

U.S. PATENT DOCUMENTS

| | | | | |
|---|---|---|---|---|
| 2020/0154412 | A1* | 5/2020 | Lee | H04L 5/001 |
| 2020/0154413 | A1 | 5/2020 | Hosseini et al. | |
| 2020/0305134 | A1* | 9/2020 | Noh | H04L 5/001 |
| 2020/0337029 | A1* | 10/2020 | Yi | H04L 5/0053 |
| 2020/0351818 | A1* | 11/2020 | Park | H04W 4/90 |
| 2020/0351892 | A1* | 11/2020 | Yi | H04L 5/0092 |
| 2021/0022122 | A1* | 1/2021 | Khoshnevisan | H04W 72/23 |
| 2021/0029726 | A1* | 1/2021 | Papasakellariou | H04W 72/21 |
| 2021/0037607 | A1* | 2/2021 | Hamidi-Sepehr | H04W 24/08 |
| 2021/0127285 | A1* | 4/2021 | Khoshnevisan | H04L 5/001 |
| 2021/0144688 | A1* | 5/2021 | Lin | H04W 72/23 |
| 2021/0168774 | A1* | 6/2021 | Li | H04L 5/0053 |
| 2021/0168781 | A1* | 6/2021 | Lee | H04W 72/23 |
| 2021/0282001 | A1* | 9/2021 | Saber | H04W 8/24 |
| 2021/0320821 | A1* | 10/2021 | Lee | H04W 56/00 |
| 2022/0182860 | A1* | 6/2022 | Chatterjee | H04L 5/0094 |
| 2022/0225393 | A1* | 7/2022 | Gao | H04W 72/23 |
| 2022/0338039 | A1* | 10/2022 | Takahashi | H04W 72/23 |
| 2023/0025637 | A1* | 1/2023 | He | H04L 5/0094 |
| 2023/0141339 | A1* | 5/2023 | Kittichokechai | H04W 24/08 370/329 |

FOREIGN PATENT DOCUMENTS

| | | |
|---|---|---|
| WO | WO-2020032774 A1 | 2/2020 |
| WO | WO-2020072963 A1 | 4/2020 |

OTHER PUBLICATIONS

Huawei: "Summary of Email Discussion [100e-NR-L1enh_URLLC_PDCCH-03] on Remaining Issues on Enhanced PDCCH Monitoring Capability," 3GPP Draft, 3GPP TSG RAN WG1 Meeting #100-e, R1-2001409, 3rd Generation Partnership Project (3GPP), Mobile Competence Centre, 650, Route Des Lucioles, F-06921, Sophia-Antipolis Cedex, France, vol. RAN WG1. No. 20200224-20200306, Mar. 6, 2020 (Mar. 6, 2020), XP051860455, 43 pages, Retrieved from the Internet: URL: https://ftp.3gpp.org/tsg_ran/WG1_RL1/TSGR1_100_e/Docs/R1-2001409.zip R1-2001409.docx [retrieved on Mar. 6, 2020] paragraph [0002].

International Search Report and Written Opinion—PCT/US2021/070559—ISA/EPO—dated Sep. 9, 2021.

Moderator (Huawei): "Summary #3 of Email Discussion [101-e-NR-L1enh-URLLC-PDCCH Enhancements-03] on Remaining Issues on Enhanced PDCCH Monitoring Capability," 3GPP Draft, 3GPP TSG RAN WG1 Meeting #101-e , R1-2005055, 3rd Generation Partnership Project (3GPP), Mobile Competence Centre, 650, Route Des Lucioles, F-06921, Sophia-Antipolis Cedex, France, vol. RAN WG1. No. E-meeting, May 25, 2020-Jun. 5, 2020, Jun. 6, 2020 (Jun. 6, 2020), XP051893702, 28 pages, Retrieved from the Internet: URL: https://ftp.3gpp.org/tsg_ran/WG1_RL1/TSGR1_101-e/Docs/R1-2005055.zip R1-2005055 Summary #3 of email discussion [101-e-NR-L1enh-URLLC-PDCCH enhancements-03] on remaining issues on enhanced PDCCH monitoring capability.docx [retrieved on Jun. 6, 2020] paragraph [02.2].

Samsung: "PDCCH Blind Decoding Capability Coordination in NR-DC", 3GPP Draft, 3GPP TSG-RAN WG2 Meeting #104, R2-1818302_PDCCH Blind Decoding Capability Coordination in NR-DC_R3, 3rd Generation Partnership Project (3GPP), Mobile Competence Centre, 650, Route Des Lucioles, F-06921, Sophia-Antipolis Cedex, France, vol. RAN WG2, No. Spokane, US; Nov. 12, 2018-Nov. 16, 2018, Nov. 12, 2018 (Nov. 12, 2018), 2 Pages, XP051557803, Retrieved from the Internet: URL: http://www.3gpp.org/ftp/Meetings%5F3GPP%5FSYNC/RAN2/Docs/R2%2D1818302%2Ezip [retrieved on Nov. 12, 2018], Section 2; p. 1, the whole document.

Spreadtrum Communications: "Discussion on PDCCH enhancements for URLLCc," 3GPP Draft, 3GPP TSG RAN WG1 #98bis, R1-1910027, 3rd Generation Partnership Project (3GPP), Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 1, 2019 (Oct. 1, 2019), pp. 1-8. XP051788834, Retrieved from the Internet: URL: http://www.3gpp.org/ftp/tsg_ran/WG1_RL1/TSGR1_98b/Docs/R1-1910027.zip [retrieved on Oct. 1, 2019] paragraph [02.2].

Ericsson: "Improving PDCCH Monitoring Capability on a Monitoring Span", 3GPP TSG-RAN WG1 Meeting #97, R1-1906104, Reno, Nevada, US, May 13, 2019-May 17, 2019, May 4, 2019, 4 pages.

CNIPA Notice of First Office Action issued in Application No. 202180033854.8, mailing date of May 23, 2024; includes report citing relevancy using A/X/Y notation (non-English).

* cited by examiner though
PHYSICAL DOWNLINK CONTROL CHANNEL MONITORING CAPABILITY REPORTING AND CONFIGURATION FOR DUAL CONNECTIVITY

CROSS-REFERENCE TO RELATED APPLICATION

This Patent Application claims priority to U.S. Provisional Patent Application No. 63/025,704, filed on May 15, 2020, entitled "PHYSICAL DOWNLINK CONTROL CHANNEL MONITORING CAPABILITY REPORTING AND CONFIGURATION FOR DUAL CONNECTIVITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical downlink control channel (PDCCH) monitoring capability reporting and configuration for dual connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station, for a master cell group (MCG) and a secondary cell group (SCG) used for a dual connectivity mode of the UE, information indicating physical downlink control channel (PDCCH) monitoring capability values for one or more of span-based monitoring or a combination of slot-based monitoring and span-based monitoring; and receiving, from the base station, PDCCH monitoring configuration values for the MCG and the SCG based at least in part on the PDCCH monitoring capability values.

In some aspects, a method of wireless communication performed by a base station includes receiving, from a UE, information indicating PDCCH monitoring capability values, for an MCG and an SCG used for a dual connectivity mode of the UE, for one or more of span-based monitoring or a combination of slot-based monitoring and span-based monitoring; and transmitting, to the UE, PDCCH monitoring configuration values for the MCG and the SCG based at least in part on the PDCCH monitoring capability values.

In some aspects, a UE for wireless communication includes a memory and one or more processors, coupled to the memory, configured to: transmit, to a base station, for an MCG and an SCG used for a dual connectivity mode of the UE, information indicating PDCCH monitoring capability values for one or more of span-based monitoring or a combination of slot-based monitoring and span-based monitoring; and receive, from the base station, PDCCH monitoring configuration values for the MCG and the SCG based at least in part on the PDCCH monitoring capability values.

In some aspects, a base station for wireless communication includes a memory and one or more processors, coupled to the memory, configured to: receive, from a UE, information indicating PDCCH monitoring capability values, for an MCG and an SCG used for a dual connectivity mode of the UE, for one or more of span-based monitoring or a combination of slot-based monitoring and span-based monitoring; and transmit, to the UE, PDCCH monitoring configuration values for the MCG and the SCG based at least in part on the PDCCH monitoring capability values.

In some aspects, a non-transitory computer-readable medium storing a set of instructions for wireless communication includes one or more instructions that, when executed by one or more processors of a UE, cause the UE to: transmit, to a base station, for an MCG and an SCG used for a dual connectivity mode of the UE, information indicating PDCCH monitoring capability values for one or more of span-based monitoring or a combination of slot-based monitoring and span-based monitoring; and receive, from the base station, PDCCH monitoring configuration values for the MCG and the SCG based at least in part on the PDCCH monitoring capability values.

In some aspects, a non-transitory computer-readable medium storing a set of instructions for wireless communication includes one or more instructions that, when executed by one or more processors of a base station, cause the base station to: receive, from a UE, information indicating PDCCH monitoring capability values, for an MCG and an SCG used for a dual connectivity mode of the UE, for one or more of span-based monitoring or a combination of slot-based monitoring and span-based monitoring; and transmit, to the UE, PDCCH monitoring configuration values for the MCG and the SCG based at least in part on the PDCCH monitoring capability values.

In some aspects, an apparatus for wireless communication includes means for transmitting, to a base station, for an MCG and an SCG used for a dual connectivity mode of the apparatus, information indicating PDCCH monitoring capability values for one or more of span-based monitoring or a combination of slot-based monitoring and span-based monitoring; and means for receiving, from the base station, PDCCH monitoring configuration values for the MCG and the SCG based at least in part on the PDCCH monitoring capability values.

In some aspects, an apparatus for wireless communication includes means for receiving, from a UE, information indicating PDCCH monitoring capability values, for an MCG and an SCG used for a dual connectivity mode of the UE, for one or more of span-based monitoring or a combination of slot-based monitoring and span-based monitoring; and means for transmitting, to the UE, PDCCH monitoring configuration values for the MCG and the SCG based at least in part on the PDCCH monitoring capability values.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
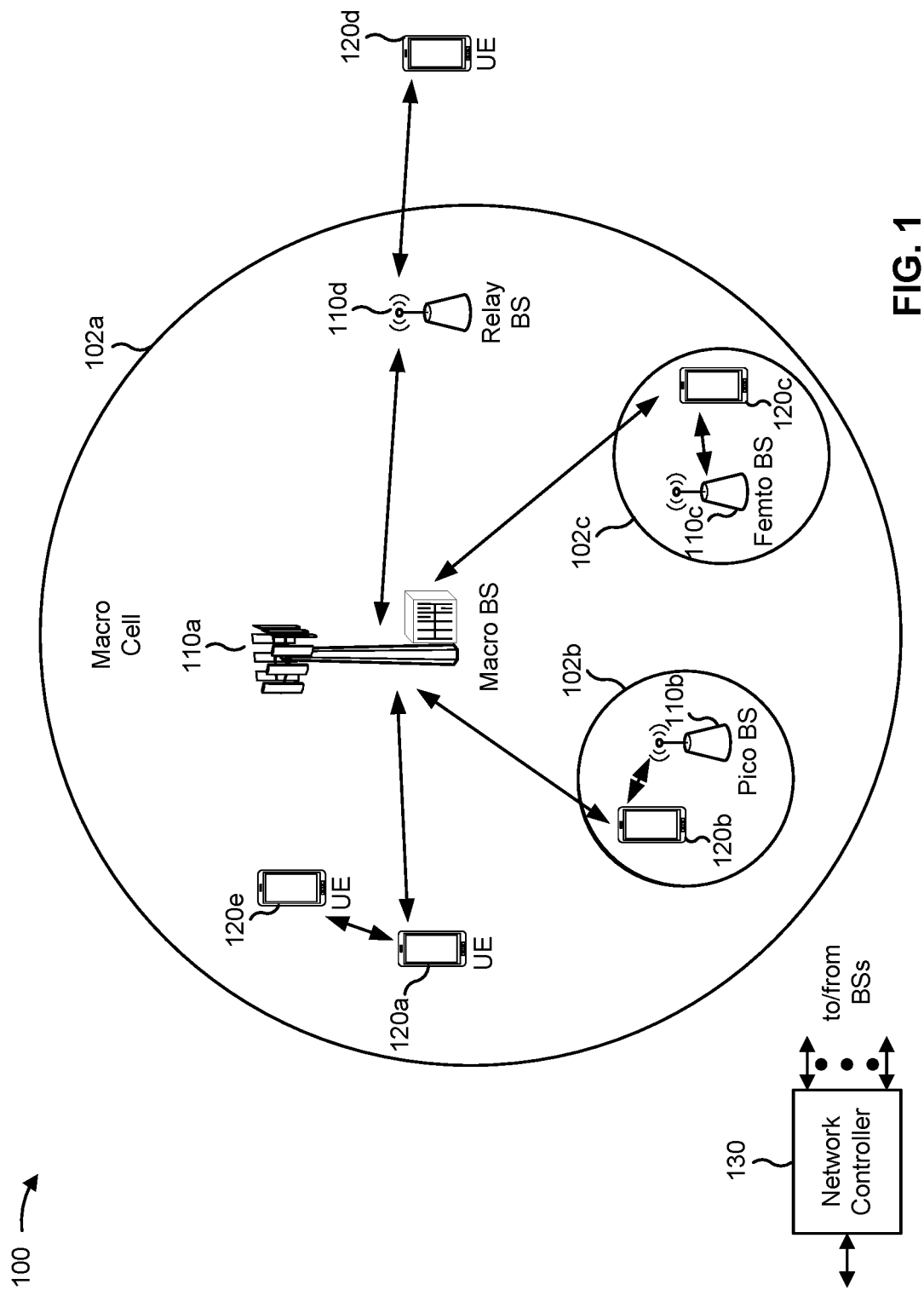
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
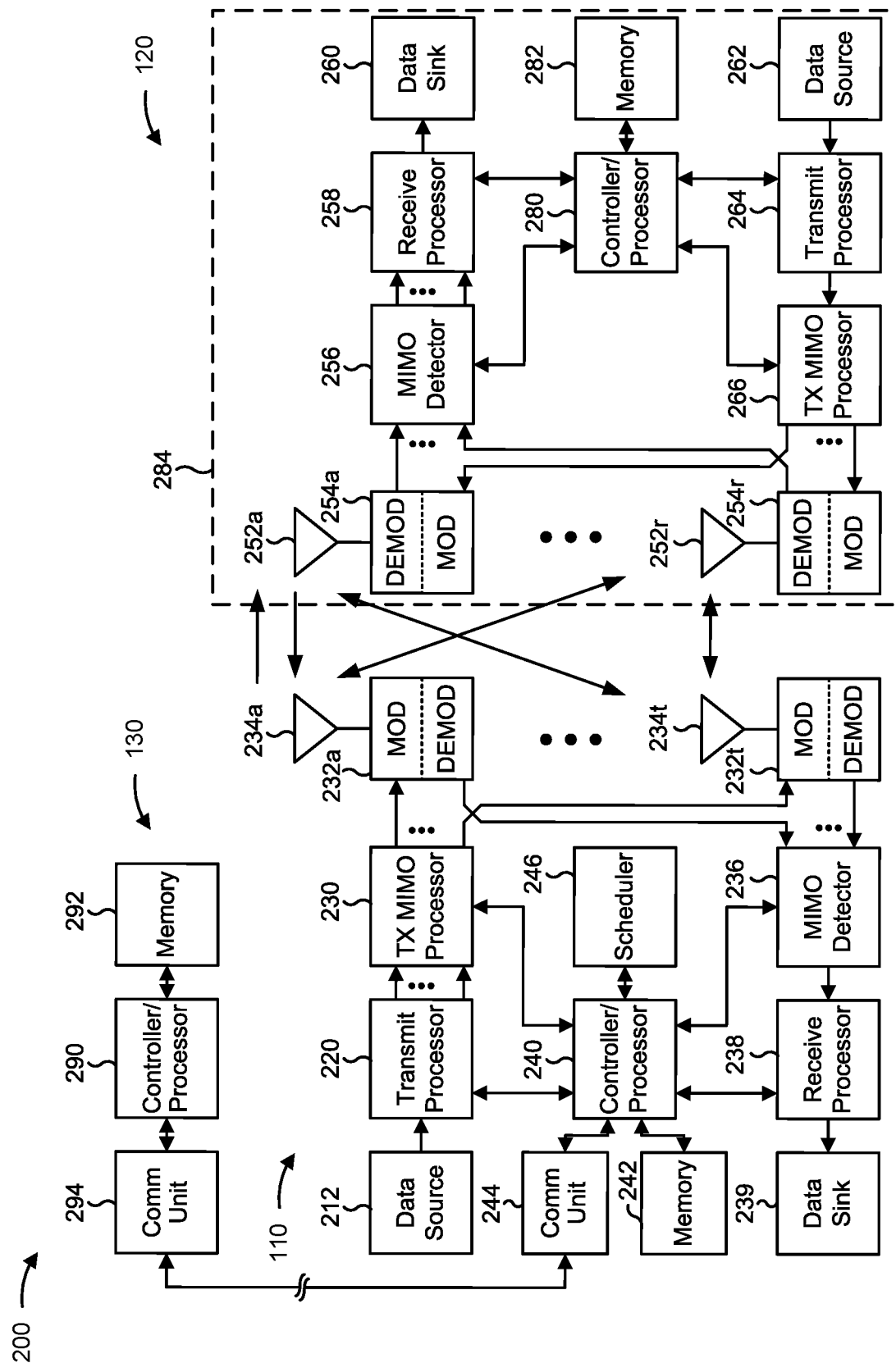
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with physical downlink control channel (PDCCH) monitoring capability reporting and configuration for dual connectivity, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for transmitting, to a base station, for a master cell group (MCG) and a secondary cell group (SCG) used for a dual connectivity mode of the UE 120, information indicating PDCCH monitoring capability values for one or more of slot-based monitoring, span-based monitoring, or a combination of slot-based monitoring and span-based monitoring, means for receiving, from the base station, PDCCH monitoring configuration values for the MCG and the SCG based at least in part on the PDCCH monitoring capability values, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, information indicating PDCCH monitoring capability values, for an MCG and an SCG used for a dual connectivity mode of the UE, for one or more of slot-based monitoring, span-based monitoring, or a combination of slot-based monitoring and span-based monitoring, means for transmitting, to the UE, PDCCH monitoring configuration values for the MCG and the SCG based at least in part on the PDCCH monitoring capability values, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some RATs, such as 3GPP Release 15 of 5G/NR, different PDCCH monitoring capabilities are defined. As an example, a feature group (FG) 3-1 may indicate that the UE is capable of monitoring all PDCCH candidates for scheduling data that are within the first few symbols of a slot. As another example, an FG 3-5b may be defined based at least in part on a span concept. A slot can include multiple spans, and a span can include one or more PDCCH candidates. Different span configurations may be supported. Span configurations are described in more detail in connection with FIG. 3.

In a 5G/NR network, a base station transmits a PDCCH (e.g., including control information, such as DCI) based at least in part on a search space set. A given search space set defines candidates that may carry a PDCCH within the search space set, where each candidate is associated with one or more control channel elements (CCEs). A CCE may be composed of multiple resource element groups (REGs). An REG may include one resource block and one OFDM symbol. One or more search space sets may be associated with a control resource set (CORESET). In a 5G/NR network, a base station may flexibly schedule and transmit the PDCCH. In other words, transmission of the PDCCH in the 5G/NR network is not limited to a particular set of frequency resources and/or time resources in a given radio frame, as in the case of, for example, an LTE network. PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set.

In order to receive a PDCCH associated with one or more candidates of a given UE-specific search space set (i.e., a search space set that may carry control information specific to one or more particular UEs), a UE may attempt to decode a PDCCH in candidates of the search space set. For example, the UE may determine one or more CCE indices associated with a candidate, and may attempt to decode the PDCCH (e.g., using a blind decoding (BD) procedure). In some cases (e.g., in 3GPP Release 15 of 5G/NR), limits on the number of non-overlapping CCEs and BDs are defined on a per-slot basis. Thus, a large number of CCEs/BDs (in the extreme case, all of them) may be configured within one span. This significantly increases the UE complexity, particularly when attempting to conform to processing timelines that are suitable for supporting ultra-reliable low latency communication (URLLC) applications. On the other hand, if the scheduler chooses to distribute the CCEs/BDs across different spans, the number of CCE/BDs per span may not be sufficient. For example, for a subcarrier spacing (SCS) of 30 kilohertz (kHz) and a span capability of (X,Y)=(2,2), each span can have 8 CCEs. Hence, only one candidate of aggregation level=8 can be supported. Span capabilities are described in more detail in connection with FIG. 3.

To address the above issues, 3GPP Release 16 of 5G/NR introduces a PDCCH monitoring capability that is based at least in part on a span configuration of the UE. To improve scheduling flexibility, the number of non-overlapping CCEs and BDs per slot are increased, as compared to 3GPP Release 15 of 5G/NR. Furthermore, to relax the UE complexity, a per-span CCE/BD limit (also referred to as a per-span capability) may be specified. This PDCCH monitoring capability may be referred to herein as a span-based monitoring capability or a Release 16 monitoring capability, whereas the PDCCH monitoring capability defined on a per-slot basis may be referred to as a slot-based monitoring capability or a Release 15 monitoring capability.

A UE may report PDCCH monitoring capabilities for a set of cases. For example, the UE may report PDCCH monitoring capabilities for Case 1, Case 2, and Case 3. Case 1 is a PDCCH monitoring capability that identifies a number of component carriers (CCs) for which the UE can perform slot-based monitoring. Case 2 is a PDCCH monitoring capability that identifies a number of CCs for which the UE can perform span-based monitoring. The value of the threshold number of CCs for Case 2 can be smaller than 4. Case 3 is a PDCCH monitoring capability that identifies the number of CCs for which the UE can perform slot-based monitoring and the number of CCs for which the UE can perform span-based monitoring on different cells. As used herein, "slot-based monitoring" may refer to a monitoring configuration in which CCE and BD limits are per slot (e.g., a Release 15 monitoring configuration), and "span-based monitoring" may refer to a monitoring configuration in which CCE and BD limits are per span (e.g., a Release 16 monitoring configuration). Each of the numbers of CCs (for slot-based monitoring and span-based monitoring) can be smaller than 4. The sum of the numbers of CCs for which the UE can perform span-based monitoring and slot-based monitoring may not be larger than 4, and may or may not be smaller than 4. In some cases, the UE may report the numbers of CCs for which the UE can perform span-based monitoring and slot-based monitoring separately from each other.

In some cases, the UE may be configured with a number of carriers that exceeds the threshold identified by the PDCCH monitoring capability. For example, if the UE is configured with both Release 15 and Release 16 PDCCHs across different carriers, and if the number of DL carriers exceeds the UE's capability for monitoring Release 15 PDCCHs and/or Release 16 PDCCHs, the number of non-overlapped CCEs to be received or BDs to be performed may exceed the UE's capabilities on one or more carriers. Therefore, it may be beneficial to split the CCEs and/or BDs across carriers with different PDCCH monitoring capabilities (e.g., slot-based versus span-based), different SCSs, and/or different span patterns. However, there may be ambiguity as to how this distribution is to be performed, particularly in cases when the UE is configured with both Release 15 PDCCHs and Release 16 PDCCHs.

In some aspects, this distribution may be performed separately for a set of carriers associated with Release 16 PDCCHs and for a set carriers associated with Release 15 PDCCHs. In this case, the UE or the BS may determine the number of non-overlapping CCEs or BDs across the carriers and per scheduled cell for the carriers configured with the Release 15 PDCCH and the Release 16 PDCCH separately. For carriers configured with the Release 15 PDCCH, a value $N_{cells}^{cap}$ may represent the number of CCs for which the UE can perform slot-based monitoring, and the distribution of BDs (e.g., represented by M in the following equations) and non-overlapped CCEs (e.g., represented by C in the following equations) may be determined as follows:

If a UE is configured with $N_{cells}^{DL,\mu}$ downlink cells with DL bandwidth parts (BWPs) having SCS configuration $\mu$ where $\Sigma_{\mu=0}^{3} N_{cells}^{DL,\mu} \leq N_{cells}^{cap}$, the UE is not required to monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell.

If a UE is configured with $N_{cells}^{DL,\mu}$ downlink cells with DL BWPs having SCS configuration $\mu$, where $\Sigma_{\mu=0}^{3} N_{cells}^{DL,\mu} > N_{cells}^{cap}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$ PDCCH candidates or more than $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$ non-overlapped CCEs per slot on the active DL BWP(s) of scheduling cell(s) from the $N_{cells}^{DL,\mu}$ downlink cells.

For each scheduled cell, the UE is not required to monitor on the active DL BWP with SCS configuration $\mu$ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

A UE may be configured to operate in a dual connectivity mode (e.g., a multi-RAT dual connectivity mode), such as an NR dual connectivity (NR-DC) mode. The UE may operate in the dual connectivity mode using an MCG (e.g., one or more cells for anchoring a network connection between the UE and a core network) and an SCG (e.g., one or more additional cells to increase throughput). However, in some cases, the UE may not be enabled to report a PDCCH monitoring capability for the MCG and the SCG for a case where all carriers of the MCG and the SCG are configured with Release 15 PDCCHs (e.g., associated with slot-based monitoring), a case where all carriers of the MCG and the SCG are configured with Release 16 PDCCHs (e.g., associated with span-based monitoring), and/or a case where one or more carriers of at least one of the MCG or the SCG are configured with Release 15 PDCCHs and one or more carriers of at least one of the MCG or the SCG are configured with Release 16 PDCCHs (e.g., associated with a combination of slot-based monitoring and span-based monitoring). Some techniques and apparatuses described herein enable a UE to report PDCCH monitoring capabilities for one or more of slot-based monitoring, span-based monitoring, or a combination of slot-based monitoring and span-based monitoring, and enable a base station to configure the UE for PDCCH monitoring based at least in part on such PDCCH monitoring capabilities.

Figure 3:
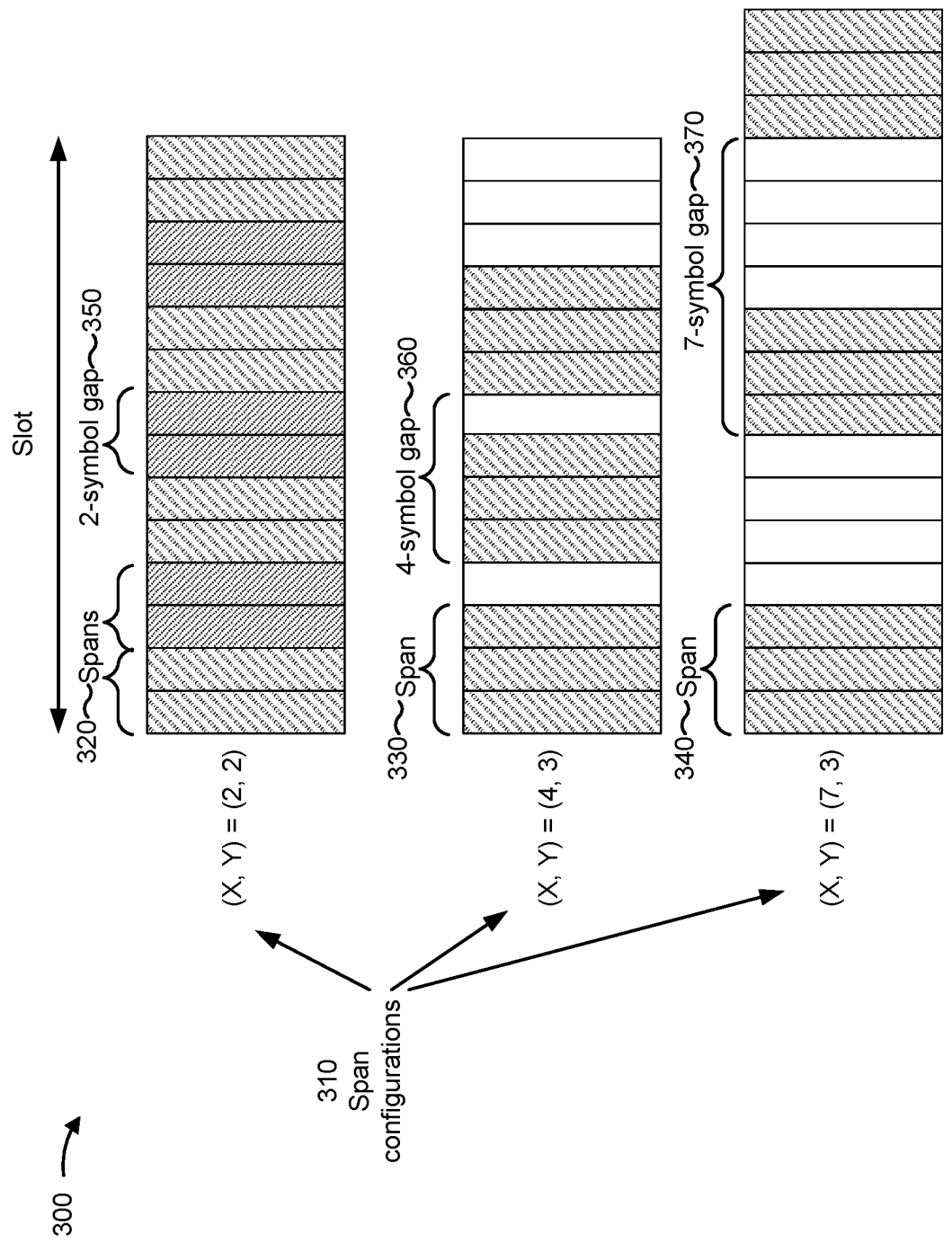
FIG. 3 is a diagram illustrating an example of spans in a slot for physical downlink control channel monitoring, in accordance with the present disclosure.

FIG. 3 is a diagram illustrating an example 300 of spans in a slot for PDCCH monitoring, in accordance with the present disclosure. FIG. 3 shows a set of slots that are associated with respective span configurations, shown by reference number 310. A span configuration may identify a minimum gap X between the starting symbol of two spans and a maximum span duration Y.

The spans corresponding to span configurations (2, 2), (4, 3), and (7, 3) are shown by reference numbers 320, 330, and 340, respectively. The spans shown by reference number 320 are shown using alternating diagonal hatching, since these spans are adjacent to each other and would be difficult to differentiate otherwise. The spans shown by reference numbers 330 and 340 are separated by symbols that are not included in a span, which are shown by white rectangles.

The minimum gap X is shown for span configurations (2, 2), (4, 3), and (7, 3) by reference numbers 350, 360, and 370, respectively. It should be noted that X defines a minimum gap, so starting symbols of a pair of spans associated with span configuration (2, 2) may be two or more symbols apart from each other. Furthermore, the maximum span duration Y defines a maximum span duration, so the span 330 may have one-symbol or two-symbol spans while still being within the definition of the span configuration (4, 3).

A span configuration may be associated with a per-span capability for a number of BDs and/or a number of non-overlapped CCEs in a span. A per-span capability for a number of BDs may identify a maximum number of BDs that can be configured in a span 320/330/340, and a per-span capability for a number of non-overlapped CCEs may identify a maximum number of non-overlapped CCEs that can be configured in a span 320/330/340. These per-span capabilities may also be referred to as a BD limit and a CCE limit, respectively.

A UE may report a capability regarding one or more span configurations supported by the UE. For example, the UE may report that the UE supports one or more of span configurations (2, 2), (4, 3), and (7, 3). The UE may determine which span configuration is to be used for a communication based at least in part on a search space configuration. For example, a search space configuration may indicate search space candidates, and the UE may identify a span configuration that aligns with the search space candidates. In the case that the search space configuration aligns with two or more span configurations, the UE may use a largest CCE limit and/or a BD limit of the CCE limits and/or BD limits associated with the two or more span configurations. The BD limit may identify a number of PDCCH candidates that the UE is required to monitor.

The UE may use a maximum CCE/BD limit and a maximum total CCE/BD limit to perform distribution of BDs and CCEs. A maximum CCE/BD limit may identify a maximum number of blind decodes or non-overlapped CCEs per span and per carrier, and a maximum total CCE/BD limit may identify a maximum number of blind decodes or non-overlapped CCEs across spans on active downlink bandwidth part(s) of scheduling cells if the spans on the scheduling cells are aligned. Alignment is described in more detail in connection with FIG. 4. In some aspects, the maximum total CCE limit may be referred to herein as C_tot or $C_{PDCCH}^{total}$ and the maximum total BD limit may be referred to herein as M_tot or $M_{PDCCH}^{total}$. CCE limits and BD limits may be different for different parameters, such as different span configurations, numerologies, numbers of TRPs (e.g., single-TRP versus multi-TRP carriers), and so on. The notation used to describe a CCE limit or BD limit may indicate one or more parameters associated with the CCE. For example, a maximum total CCE limit for a given SCS and a given span configuration may be denoted by $C_{PDCCH}^{total,(X,Y),\mu}$.

In some aspects, "hard splitting" may refer to dividing a plurality of carriers into two or more groups of carriers based at least in part on one or more properties of the plurality of carriers. For example, if a set of carriers is hard-split based at least in part on SCS, then all carriers of the set of carriers associated with a first SCS may be placed in a first group, all carriers associated with a second SCS may be placed in a second group, and so on. A group of carriers, formed by hard-splitting a plurality of carriers, may be associated with a set of BDs or CCEs that are to be distributed among the group of carriers. "Soft splitting" may be performed within a group that is formed by hard splitting a plurality of carriers. For example, a set of CCEs or BDs, of a group of carriers, may be soft-split among the group of carriers based at least in part on one or more rules. That is, a total number of BDs and/or CCEs for a group of carriers may be distributed across the carriers in the group. However, the distribution should respect (e.g., satisfy) per-carrier CCE or BD limits (e.g., per-slot limits or per-span limits).

As indicated above, FIG. 3 is provided as an example. Other examples may differ from what is described with respect to FIG. 3.

Figure 4:
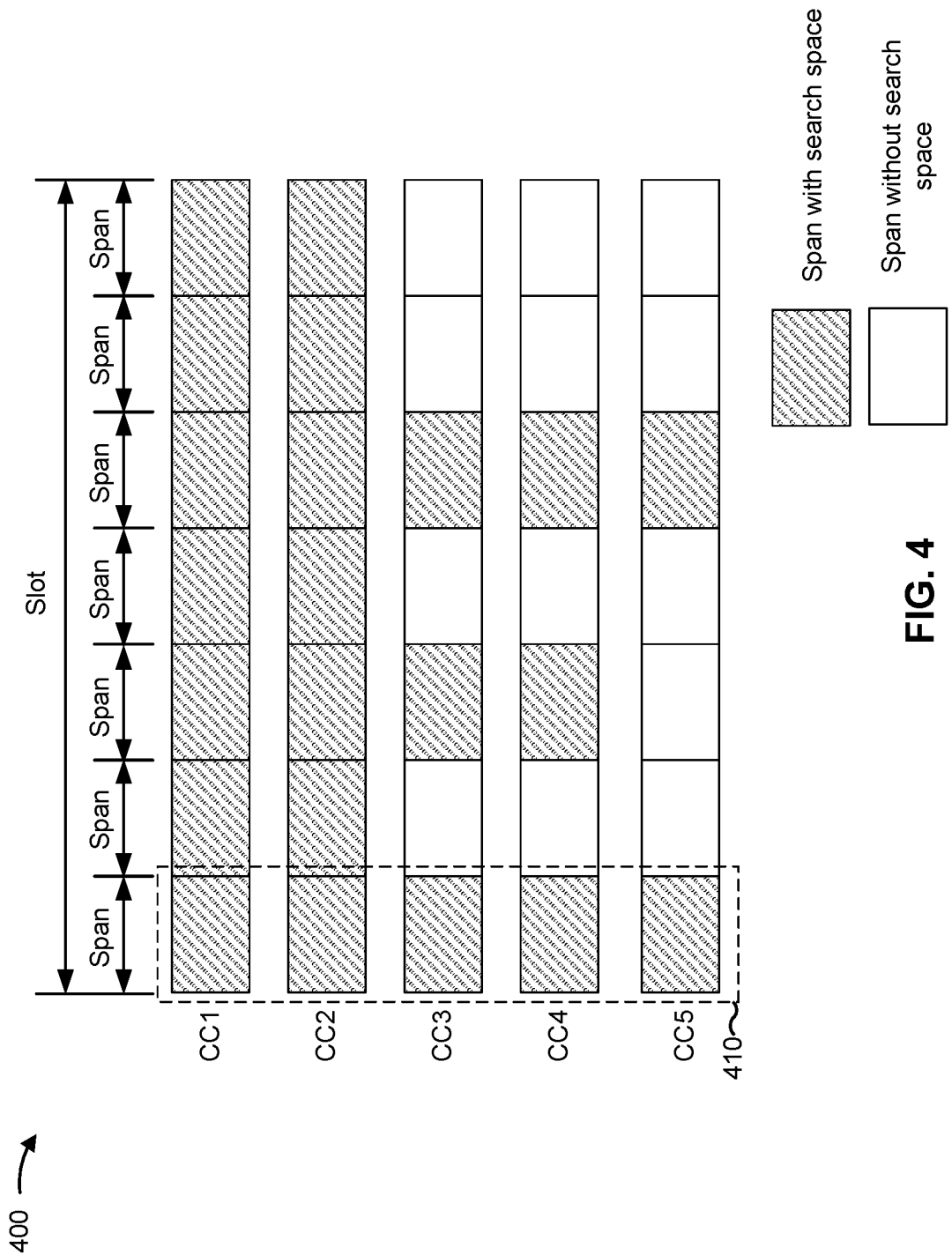
FIG. 4 is a diagram illustrating an example of alignment and non-alignment of spans based at least in part on whether search spaces are configured in the spans, in accordance with the present disclosure.

FIG. 4 is a diagram illustrating an example 400 of alignment and non-alignment of spans based at least in part on whether search spaces are configured in the spans, in accordance with the present disclosure. FIG. 4 shows spans on a plurality of component carriers (CCs). It should be noted that "CC" is generally used interchangeably with "cell" and "carrier" herein. The spans shown in FIG. 4 use a span configuration of (2, 2) in a slot with a 30 kHz SCS. Thus, in FIG. 4, the slot includes 14 symbols (not shown) and a span starts every two symbols. A diagonal fill indicates that a search space (SS) is configured on a span of a CC. A span in which an SS is configured may be referred to as a configured span. As shown, for CC1 and CC2, all spans are configured, whereas for CC3, CC4, and CC5, respective subsets of spans are configured.

Two or more CCs are said to be aligned when the two or more CCs have a same SCS and span configuration (e.g., (X, Y)), the two or more CCs share one or more sets of overlapping configured spans, and each set of overlapping configured spans of the two or more CCs starts from a respective same symbol. Reference number 410 shows a set of overlapping spans of CC1 through CC5 that start from the same symbol. In example 400, under one definition of alignment, CC1 through CC5 are not all aligned with each other, since not all configured spans of CC1 through CC5 overlap. For example, while all spans are configured on CC1 and CC2, not all spans are configured on CC3, CC4, and CC5. In example 400, under another definition of alignment, CC1 through CC5 are aligned with each other. According to the other definition of alignment, spans on cells are considered to be aligned if a union of all PDCCH monitoring occasions on all cells results in PDCCH monitoring according to a span configuration (e.g., (X, Y)).

The maximum total BD and CCE limits of the UE may be respected across spans in each overlapped group of spans. For example, for the group of configured spans shown by reference number 410, BDs and CCEs must be limited to both the maximum CCE/BD limit on a given carrier and the maximum total CCE/BD limit across CC1 through CC5 in the aggregate. In some aspects (e.g., for aligned CCs), respective groups of spans (shown as 7 groups in FIG. 4) may include different numbers of spans (e.g., because some carriers do not include configured spans in particular occasions). In some aspects (e.g., for non-aligned CCs), combinations of spans may be determined, and each combination may include at most one span from a particular carrier. In this case, BD and/or CCE limits may be respected (e.g., satisfied) for each combination of spans.

As indicated above, FIG. 4 is provided as an example. Other examples may differ from what is provided with regard to FIG. 4.

Figure 5:
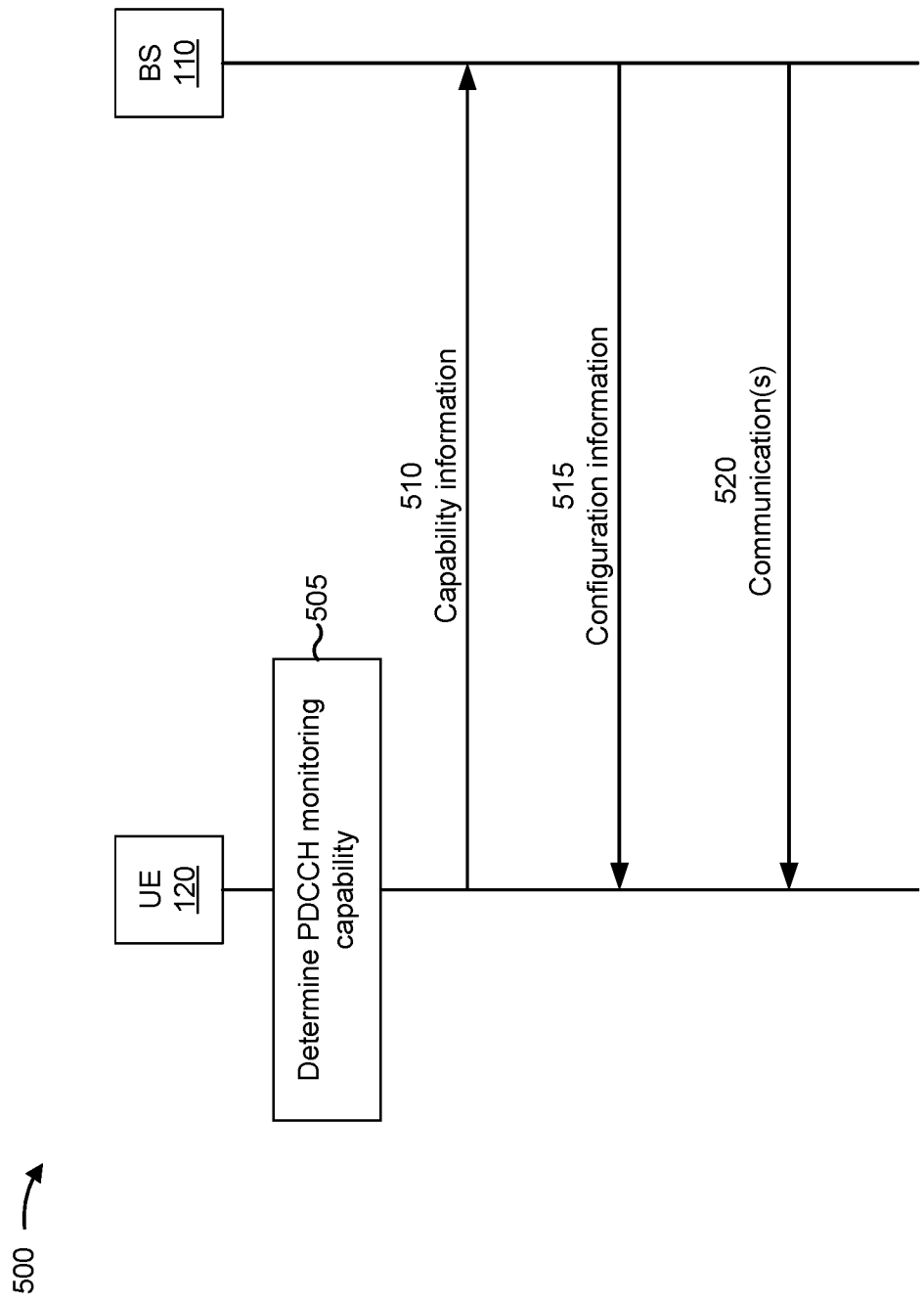
FIG. 5 is a diagram illustrating an example associated with PDCCH monitoring capability reporting and configuration for dual connectivity, in accordance with the present disclosure.

FIG. 5 is a diagram illustrating an example 500 of PDCCH monitoring capability reporting and configuration for dual connectivity, in accordance with the present disclosure. As shown in FIG. 5, a UE 120 and a BS 110 may communicate with one another.

As shown by reference number 505, the UE 120 may determine a PDCCH monitoring capability of the UE 120. That is, the UE 120 may determine PDCCH monitoring capability values of the UE 120. A PDCCH monitoring capability value may indicate a maximum scaling value that the UE 120 can apply (e.g., for use in a dual connectivity mode of the UE 120) to an indicated PDCCH monitoring configuration. The indicated PDCCH monitoring configuration may indicate a maximum quantity of monitored PDCCH candidates (e.g., blind decodes) per slot or span and per serving cell, and/or a maximum quantity of non-overlapped CCEs per slot or span and per serving cell.

In some aspects, the UE 120 may determine PDCCH monitoring capability values for an MCG and an SCG used for a dual connectivity mode (e.g., an NR-DC mode) of the UE 120. In some aspects, the UE 120 may determine PDCCH monitoring capability values, for the MCG and the SCG, for one or more PDCCH monitoring cases.

In a first PDCCH monitoring case (Case 1), all carriers of the MCG and all carriers of the SCG are configured with a Release 15 PDCCH. That is, the UE 120 may determine PDCCH monitoring capability values, for the MCG and the SCG, for slot-based monitoring. In a second PDCCH monitoring case (Case 2), all carriers of the MCG and all carriers of the SCG are configured with a Release 16 PDCCH. That is, the UE 120 may determine PDCCH monitoring capability values, for the MCG and the SCG, for span-based monitoring. In a third PDCCH monitoring case (Case 3), one or more carriers of at least one of the MCG or the SCG are configured with a Release 15 PDCCH and one or more carriers of at least one of the MCG or the SCG are configured with a Release 16 PDCCH. That is, the UE 120 may determine PDCCH monitoring capability values, for the MCG and the SCG, for a combination of slot-based monitoring and span-based monitoring.

In some aspects (e.g., for Case 1), the UE 120 may determine a PDCCH monitoring capability value for the MCG for Release 15 PDCCH/slot-based monitoring, and/or a PDCCH monitoring capability value for the SCG for Release 15 PDCCH/slot-based monitoring. In some aspects (e.g., for Case 2), the UE 120 may determine a PDCCH monitoring capability value for the MCG for Release 16 PDCCH/span-based monitoring (e.g., pdcch-BlindDetectionMCG-UE-r16), and/or a PDCCH monitoring capability value for the SCG for Release 16 PDCCH/span-based monitoring (e.g., pdcch-BlindDetectionSCG-UE-r16). In some aspects (e.g., for Case 3), the UE 120 may determine a PDCCH monitoring capability value for the MCG for Release 15 PDCCH/slot-based monitoring (e.g., pdcch-BlindDetectionMCG-UE-r15), a PDCCH monitoring capability value for the SCG for Release 15 PDCCH/slot-based monitoring (e.g., pdcch-BlindDetectionSCG-UE-r15), a PDCCH monitoring capability value for the MCG for Release 16 PDCCH/span-based monitoring (e.g., pdcch-BlindDetectionMCG-UE-r16), and/or a PDCCH monitoring capability value for the SCG for Release 16 PDCCH/span-based monitoring (e.g., pdcch-BlindDetectionSCG-UE-r16).

A PDCCH monitoring capability value for the MCG for Release 15 PDCCH/slot-based monitoring may be referred to herein as an MCG Release 15 capability value. A PDCCH monitoring capability value for the SCG for Release 15 PDCCH/slot-based monitoring may be referred to herein as an SCG Release 15 capability value. A PDCCH monitoring capability value for the MCG for Release 16 PDCCH/span-based monitoring may be referred to herein as an MCG Release 16 capability value. A PDCCH monitoring capability value for the SCG for Release 16 PDCCH/span-based monitoring may be referred to herein as an SCG Release 16 capability value.

In some aspects, for Case 1, existing parameters may be used by the UE 120 for PDCCH monitoring capability reporting (e.g., pdcch-BlindDetectionMCG-UE, pdcch-BlindDetectionSCG-UE, and/or the like). In some aspects, for Case 2, new parameters may be defined for the UE 120 for PDCCH monitoring capability reporting (e.g., pdcch-BlindDetectionMCG-UE-r16, pdcch-BlindDetectionSCG-UE-r16, and/or the like). In some aspects, for Case 3, new parameters may be defined for the UE 120 for PDCCH monitoring capability reporting (e.g., pdcch-BlindDetectionMCG-UE-r15, pdcch-BlindDetectionSCG-UE-r15, pdcch-BlindDetectionMCG-UE-r16, pdcch-BlindDetectionSCG-UE-r16, and/or the like).

In some aspects, the UE 120 may determine a PDCCH monitoring capability value with respect to a particular value range. For example, if a PDCCH monitoring capability value for carrier aggregation (CA) for Release 15 PDCCH/slot-based monitoring (e.g., pdcch-BlindDetectionCA-r15, which may be referred to herein as a CA Release 15 capability value) is being reported by the UE 120, then the UE 120 may determine an MCG Release 15 capability value, or an SCG Release 15 capability value, that is less than the CA Release 15 capability value (e.g., pdcch-BlindDetectionMCG-UE-r15 or pdcch-BlindDetectionSCG-UE-r15 has a value in a range of [1, . . . , pdcch-BlindDetectionCA-r15-1]). In this case, a sum of the MCG Release 15 capability value and the SCG Release 15 capability value may be greater than, or equal to, the CA Release 15 capability value.

As another example, if a CA Release 15 capability value is not being reported by the UE 120, then the UE 120 may determine an MCG Release 15 capability value, or an SCG Release 15 capability value, from a set of values (e.g., pdcch-BlindDetectionMCG-UE-r15 or pdcch-BlindDetectionSCG-UE-r15 has a value in a range of [1, 2, 3]). In this case, a sum of the MCG Release 15 capability value and the SCG Release 15 capability value may be greater than, or equal to, a maximum total quantity of downlink cells that can be configured, for the UE 120, for Release 15 PDCCH/slot-based monitoring on the MCG and the SCG (e.g., $N_{NR-DC,max,r15}^{DL,cells}$).

The MCG Release 15 capability value and/or the SCG Release 15 capability value may be determined by the UE 120, as described above, for Case 1 and/or Case 3 PDCCH monitoring.

As a further example, if a PDCCH monitoring capability value for carrier aggregation for Release 16 PDCCH/span-based monitoring (e.g., pdcch-BlindDetectionCA-r16, which may be referred to herein as a CA Release 16 capability value) is being reported by the UE 120, then the UE 120 may determine an MCG Release 16 capability value, or an SCG Release 16 capability value, that is less than the CA Release 16 capability value (e.g., pdcch-BlindDetectionMCG-UE-r16 or pdcch-BlindDetectionSCG-UE-r16 has a value in a range of [1, . . . , pdcch-BlindDetectionCA-r16-1]). In this case, a sum of the MCG Release 16 capability value and the SCG Release 16 capability value may be greater than, or equal to, the CA Release 16 capability value.

As an additional example, if a CA Release 16 capability value is not being reported by the UE 120, then the UE 120 may determine an MCG Release 16 capability value, or an SCG Release 16 capability value, from a set of values (e.g., pdcch-BlindDetectionMCG-UE-r16 or pdcch-BlindDetectionSCG-UE-r16 has a value in a range of [1, 2, 3]). In this case, a sum of the MCG Release 16 capability value and the SCG Release 16 capability value may be greater than, or equal to, a maximum total quantity of downlink cells that can be configured, for the UE 120, for Release 16 PDCCH/span-based monitoring on the MCG and the SCG (e.g., $N_{NR-DC,max,r16}^{DL,cells}$).

The MCG Release 16 capability value and/or the SCG Release 16 capability value may be determined by the UE 120, as described above, for Case 2 and/or Case 3 PDCCH monitoring.

As shown by reference number 510, the UE 120 may transmit (e.g., may signal, such as by radio resource control (RRC) signaling), and the BS 110 may receive, capability information. In some aspects, the capability information may include PDCCH monitoring capability values (e.g., for one or more of Case 1, Case 2, or Case 3), as described above. Accordingly, the capability information may identify a CCE limit and/or a blind decode limit (e.g., according to the scaling of the PDCCH monitoring capability values) for the UE 120 for the MCG and/or the SCG. In some aspects, the PDCCH monitoring capability values may include a CA Release 15 capability value, a CA Release 16 capability value, and/or the like. In some aspects, the capability information may include information relating to Release 16 PDCCH monitoring, such as a capability indicating whether the UE 120 can be configured with one or more carriers for Release 16 PDCCH monitoring, and/or the like.

In some aspects, the UE 120 may transmit each PDCCH monitoring capability value separately. For example, the UE 120 may separately transmit an MCG Release 15 capability value, an SCG Release 15 capability value, an MCG Release 16 capability value, and/or an SCG Release 16 capability value. In some aspects, the UE 120 may transmit a pair of PDCCH monitoring capability values for the MCG separately from a pair of PDCCH monitoring capability values for the SCG. For example, the UE 120 may transmit together an MCG Release 15 capability value and an MCG Release 16 capability value, and the UE 120 may transmit together an SCG Release 15 capability value and an SCG Release 16 capability value. In some aspects, the UE 120 may transmit all PDCCH monitoring capability values together. For example, the UE 120 transmit together an MCG Release 15 capability value, an MCG Release 16 capability value, an SCG Release 15 capability value, and an SCG Release 16 capability value.

In some aspects, the UE 120 may determine and transmit multiple sets of PDCCH monitoring capability values. For example, the UE 120 may transmit a first set of an MCG Release 15 capability value, an MCG Release 16 capability value, an SCG Release 15 capability value, and an SCG Release 16 capability value, may transmit a second set of an MCG Release 15 capability value, an MCG Release 16 capability value, an SCG Release 15 capability value, and an SCG Release 16 capability value, and so forth. In such a case, the BS 110 may select a set of PDCCH monitoring capability values, and configure the UE 120 with the selected set.

As shown by reference number 515, the BS 110 may transmit (e.g., may signal, such as by RRC signaling), and the UE 120 may receive, configuration information. The configuration information may be based at least in part on the capability information reported by the UE 120. That is, the BS 110 may determine the configuration information based at least in part on the capability information reported by the UE 120 (e.g., values determined for the configuration information may not exceed maximum values indicated by the capability information).

In some aspects, the configuration information may configure a plurality of carriers, on the MCG and/or the SCG, for the UE 120. For example, the configuration information may indicate whether each carrier, of the plurality of carriers, is associated with a Release 15 (e.g., slot-based) PDCCH monitoring configuration or a Release 16 (e.g., span-based) PDCCH monitoring configuration.

In some aspects (e.g., for Case 1), the BS 110 may determine a PDCCH monitoring configuration value for the MCG for Release 15 PDCCH/slot-based monitoring, and/or a PDCCH monitoring configuration value for the SCG for Release 15 PDCCH/slot-based monitoring. In some aspects (e.g., for Case 2), the BS 110 may determine a PDCCH monitoring configuration value for the MCG for Release 16 PDCCH/span-based monitoring (e.g., pdcch-BlindDetection-r16 for the MCG), and/or a PDCCH monitoring configuration value for the SCG for Release 16 PDCCH/span-based monitoring (e.g., pdcch-BlindDetection-r16 for the SCG). In some aspects (e.g., for Case 3), the BS 110 may determine a PDCCH monitoring configuration value for the MCG for Release 15 PDCCH/slot-based monitoring (e.g., pdcch-BlindDetection-r15 for the MCG), a PDCCH monitoring configuration value for the SCG for Release 15 PDCCH/slot-based monitoring (e.g., pdcch-BlindDetection-r15 for the SCG), a PDCCH monitoring configuration value for the MCG for Release 16 PDCCH/span-based monitoring (e.g., pdcch-BlindDetection-r16 for the MCG), and/or a PDCCH monitoring configuration value for the SCG for Release 16 PDCCH/span-based monitoring (e.g., pdcch-BlindDetection-r16 for the SCG).

A PDCCH monitoring configuration value for the MCG for Release 15 PDCCH/slot-based monitoring may be referred to herein as an MCG Release 15 configuration value. A PDCCH monitoring configuration value for the SCG for Release 15 PDCCH/slot-based monitoring may be referred to herein as an SCG Release 15 configuration value. A PDCCH monitoring configuration value for the MCG for Release 16 PDCCH/span-based monitoring may be referred to herein as an MCG Release 16 configuration value. A PDCCH monitoring configuration value for the SCG for Release 16 PDCCH/span-based monitoring may be referred to herein as an SCG Release 16 configuration value.

In some aspects, for Case 1, existing parameters may be used by the BS 110 for PDCCH monitoring configuration (e.g., pdcch-BlindDetection for the MCG, pdcch-BlindDetection for the SCG, and/or the like). In some aspects, for Case 2, new parameters may be defined for the BS 110 for PDCCH monitoring configuration (e.g., pdcch-BlindDetection-r16 for the MCG, pdcch-BlindDetection-r16 for the SCG, and/or the like). In some aspects, for Case 3, new parameters may be defined for the BS 110 for PDCCH monitoring configuration (e.g., pdcch-BlindDetection-r15 for the MCG, pdcch-BlindDetection-r15 for the SCG, pdcch-BlindDetection-r16 for the MCG, pdcch-BlindDetection-r16 for the SCG, and/or the like).

In some aspects, the BS 110 may determine a PDCCH monitoring configuration value with respect to a threshold value. For example, if a CA Release 15 capability value is reported by the UE 120, then a sum of an MCG Release 15 configuration value and an SCG Release 15 configuration value, determined by the BS 110, may be less than or equal to the CA Release 15 capability value. As another example, if a CA Release 15 capability value is not reported by the UE 120, then a sum of an MCG Release 15 configuration value and an SCG Release 15 configuration value, determined by the BS 110, may be less than or equal to a total quantity of downlink cells of the MCG and the SCG configured for Release 15 PDCCH/slot-based monitoring. The MCG Release 15 configuration value and/or the SCG Release 15 configuration value may be determined by the BS 110, as described above, for Case 1 and/or Case 3 PDCCH monitoring.

As a further example, if a CA Release 16 capability value is reported by the UE 120, then a sum of an MCG Release 16 configuration value and an SCG Release 16 configuration value, determined by the BS 110, may be less than or equal to the CA Release 16 capability value. As an additional example, if a CA Release 16 capability value is not reported by the UE 120, then a sum of an MCG Release 16 configuration value and an SCG Release 16 configuration value, determined by the BS 110, may be less than or equal to a total quantity of downlink cells of the MCG and the SCG configured for Release 16 PDCCH/span-based monitoring. The MCG Release 16 configuration value and/or the SCG Release 16 configuration value may be determined by the BS 110, as described above, for Case 2 and/or Case 3 PDCCH monitoring.

As shown by reference number 520, the BS 110 may transmit, and the UE 120 may receive, one or more communications (e.g., PDCCH communications, such as downlink control information (DCI) messages) based at least in part on the PDCCH monitoring configuration information (e.g., the PDCCH monitoring configuration values determined by the BS 110). The UE 120 may receive the one or more communications on carriers of the MCG and/or the SCG.

In some aspects, the UE 120 may determine a distribution of at least one of CCEs or blind decodes on carriers of the MCG and/or the SCG based at least in part on the configuration information (e.g., based at least in part on the PDCCH monitoring configuration values). Accordingly, the UE 120 may receive the one or more communications according to the distribution that is determined.

In some aspects, the UE 120 may determine a distribution based at least in part on whether spans on carriers are aligned or not aligned. In some aspects (e.g., when the UE 120 is configured with one or more Release 16 PDCCH carriers in the MCG and the SCG), the UE 120 may determine (e.g., for carriers associated with the same SCS and/or span configuration) whether spans of carriers are aligned for the MCG, and separately determine (e.g., for carriers associated with the same SCS and/or span configuration) whether spans of carriers are aligned for the SCG. Accordingly, the UE 120 may determine the distribution for a group of carriers (e.g., carriers associated with the same SCS and/or span configuration), in the MCG or the SCG, based at least in part on whether spans of the group of carriers are aligned.

As indicated above, FIG. 5 is provided as an example. Other examples may differ from what is provided with regard to FIG. 5.

Figure 6:
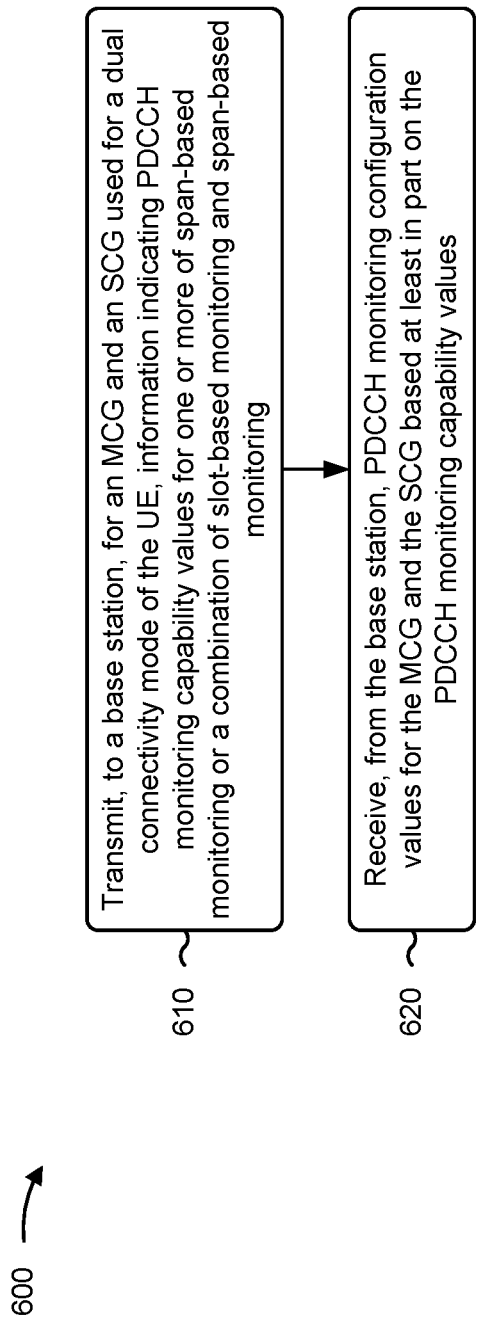
FIGS. 6 and 7 are diagrams illustrating example processes associated with PDCCH monitoring capability reporting and configuration for dual connectivity, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with PDCCH monitoring capability reporting and configuration for dual connectivity.

As shown in FIG. 6, in some aspects, process 600 may include transmitting, to a base station, for an MCG and an SCG used for a dual connectivity mode of the UE, information indicating PDCCH monitoring capability values for one or more of span-based monitoring or a combination of slot-based monitoring and span-based monitoring (block 610). For example, the UE (e.g., using transmit processor 264, TX MIMO processor 266, MOD 254, antenna 252, controller/processor 280, memory 282, and/or the like) may transmit, to a base station, for an MCG and an SCG used for a dual connectivity mode of the UE, information indicating PDCCH monitoring capability values for one or more of span-based monitoring or a combination of slot-based monitoring and span-based monitoring, as described above.

As further shown in FIG. 6, in some aspects, process 600 may include receiving, from the base station, PDCCH monitoring configuration values for the MCG and the SCG based at least in part on the PDCCH monitoring capability values (block 620). For example, the UE (e.g., using controller/processor 280, DEMOD 254, MIMO detector 256, receive processor 258, antenna 252, and/or the like) may receive, from the base station, PDCCH monitoring configuration values for the MCG and the SCG based at least in part on the PDCCH monitoring capability values, as described above.

Process 600 may include additional aspects, such as any single aspect or any combination of aspects described below and/or in connection with one or more other processes described elsewhere herein.

In a first aspect, the information indicates a PDCCH monitoring capability value for the MCG for slot-based monitoring, and a PDCCH monitoring capability value for the SCG for slot-based monitoring.

In a second aspect, alone or in combination with the first aspect, the information indicates a PDCCH monitoring capability value for the MCG for span-based monitoring, and a PDCCH monitoring capability value for the SCG for span-based monitoring.

In a third aspect, alone or in combination with one or more of the first and second aspects, the information indicates a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring.

In a fourth aspect, alone or in combination with one or more of the first through third aspects, process 600 includes receiving a PDCCH monitoring configuration value for the MCG for slot-based monitoring and a PDCCH monitoring configuration value for the SCG for slot-based monitoring, and a sum of the PDCCH is monitoring configuration value for the MCG for slot-based monitoring and the PDCCH monitoring configuration value for the SCG for slot-based monitoring satisfies a threshold value.

In a fifth aspect, alone or in combination with one or more of the first through fourth aspects, the threshold value is a reported PDCCH monitoring capability value for carrier aggregation for slot-based monitoring, or a total quantity of downlink cells of the MCG and the SCG that are configured for slot-based monitoring.

In a sixth aspect, alone or in combination with one or more of the first through fifth aspects, process 600 includes receiving a PDCCH monitoring configuration value for the MCG for span-based monitoring and a PDCCH monitoring configuration value for the SCG for span-based monitoring, and a sum of the PDCCH is monitoring configuration value for the MCG for span-based monitoring and the PDCCH monitoring configuration value for the SCG for span-based monitoring satisfies a threshold value.

In a seventh aspect, alone or in combination with one or more of the first through sixth aspects, the threshold value is a reported PDCCH monitoring capability value for carrier aggregation for span-based monitoring, or a total quantity of downlink cells of the MCG and the SCG that are configured for span-based monitoring.

In an eighth aspect, alone or in combination with one or more of the first through seventh aspects, a PDCCH monitoring capability value for the MCG for slot-based monitoring, or a PDCCH monitoring capability value for the SCG for slot-based monitoring, is less than a reported PDCCH monitoring capability value for carrier aggregation for slot-based monitoring, and a sum of the PDCCH monitoring capability value for the MCG for slot-based monitoring and the PDCCH monitoring capability value for the SCG for slot-based monitoring is greater than or equal to the reported PDCCH monitoring capability value for carrier aggregation for slot-based monitoring.

In a ninth aspect, alone or in combination with one or more of the first through eighth aspects, a PDCCH monitoring capability value for the MCG for slot-based monitoring, or a PDCCH monitoring capability value for the SCG for slot-based monitoring, is selected from a set of values, and a sum of the PDCCH monitoring capability value for the MCG for slot-based monitoring and the PDCCH monitoring capability value for the SCG for slot-based monitoring is greater than or equal to a maximum quantity of downlink cells of the MCG or the SCG that can be configured for slot-based monitoring.

In a tenth aspect, alone or in combination with one or more of the first through ninth aspects, a PDCCH monitoring capability value for the MCG for span-based monitoring, or a PDCCH monitoring capability value for the SCG for span-based monitoring, is less than a reported PDCCH monitoring capability value for carrier aggregation for span-based monitoring, and a sum of the PDCCH monitoring capability value for the MCG for span-based monitoring and the PDCCH monitoring capability value for the SCG for span-based monitoring is greater than or equal to the reported PDCCH monitoring capability value for carrier aggregation for span-based monitoring.

In an eleventh aspect, alone or in combination with one or more of the first through tenth aspects, a PDCCH monitoring capability value for the MCG for span-based monitoring, or a PDCCH monitoring capability value for the SCG for span-based monitoring, is selected from a set of values, and a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for span-based monitoring.

In a twelfth aspect, alone or in combination with one or more of the first through eleventh aspects, a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring are transmitted separately.

In a thirteenth aspect, alone or in combination with one or more of the first through twelfth aspects, a PDCCH monitoring capability value for the MCG for slot-based monitoring and a PDCCH monitoring capability value for the MCG for span-based monitoring are transmitted together, and a PDCCH monitoring capability value for the SCG for slot-based monitoring and a PDCCH monitoring capability value for the SCG for span-based monitoring are transmitted together.

In a fourteenth aspect, alone or in combination with one or more of the first through thirteenth aspects, a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring are transmitted together.

In a fifteenth aspect, alone or in combination with one or more of the first through fourteenth aspects, process 600 includes determining a distribution, of at least one of control channel elements or blind decodes, on a plurality of carriers of the MCG and a plurality of carriers of the SCG based at least in part on a determination of whether spans on the plurality of carriers of the MCG are aligned and a separate determination of whether spans on the plurality of carriers of the SCG are aligned.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
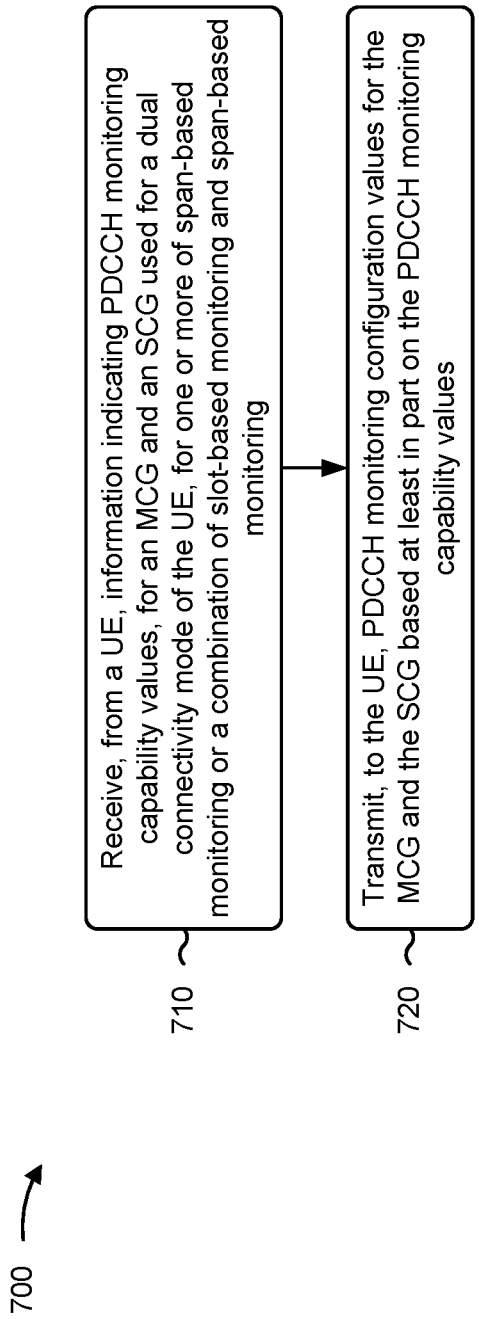

FIG. 7 is a diagram illustrating an example process 700 performed, for example, by a base station, in accordance with the present disclosure. Example process 700 is an example where the base station (e.g., base station 110 and/or the like) performs operations associated with PDCCH monitoring capability reporting and configuration for dual connectivity.

As shown in FIG. 7, in some aspects, process 700 may include receiving, from a UE, information indicating PDCCH monitoring capability values, for an MCG and an SCG used for a dual connectivity mode of the UE, for one or more of span-based monitoring or a combination of slot-based monitoring and span-based monitoring (block 710). For example, the base station (e.g., using antenna 234, DEMOD 232, MIMO detector 236, receive processor 238, controller/processor 240, and/or the like) may receive, from a UE, information indicating PDCCH monitoring capability values, for an MCG and an SCG used for a dual connectivity mode of the UE, for one or more of span-based monitoring or a combination of slot-based monitoring and span-based monitoring, as described above.

As further shown in FIG. 7, in some aspects, process 700 may include transmitting, to the UE, PDCCH monitoring configuration values for the MCG and the SCG based at least in part on the PDCCH monitoring capability values (block 720). For example, the base station (e.g., using controller/processor 240, transmit processor 220, TX MIMO processor 230, MOD 232, antenna 234, and/or the like) may transmit, to the UE, PDCCH monitoring configuration values for the MCG and the SCG based at least in part on the PDCCH monitoring capability values, as described above.

Process 700 may include additional aspects, such as any single aspect or any combination of aspects described below and/or in connection with one or more other processes described elsewhere herein.

In a first aspect, the information indicates a PDCCH monitoring capability value for the MCG for slot-based monitoring, and a PDCCH monitoring capability value for the SCG for slot-based monitoring.

In a second aspect, alone or in combination with the first aspect, the information indicates a PDCCH monitoring capability value for the MCG for span-based monitoring, and a PDCCH monitoring capability value for the SCG for span-based monitoring.

In a third aspect, alone or in combination with one or more of the first and second aspects, the information indicates a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring.

In a fourth aspect, alone or in combination with one or more of the first through third aspects, the PDCCH monitoring configuration values include a PDCCH monitoring configuration value for the MCG for slot-based monitoring and a PDCCH monitoring configuration value for the SCG for slot-based monitoring, and a sum of the PDCCH monitoring configuration value for the MCG for slot-based monitoring and the PDCCH monitoring configuration value for the SCG for slot-based monitoring satisfies a threshold value.

In a fifth aspect, alone or in combination with one or more of the first through fourth aspects, the threshold value is a UE-reported PDCCH monitoring capability value for carrier aggregation for slot-based monitoring, or a total quantity of downlink cells of the MCG and the SCG that are configured for the UE for slot-based monitoring.

In a sixth aspect, alone or in combination with one or more of the first through fifth aspects, the PDCCH monitoring configuration values include a PDCCH monitoring configuration value for the MCG for span-based monitoring and a PDCCH monitoring configuration value for the SCG for span-based monitoring, and a sum of the PDCCH monitoring configuration value for the MCG for span-based monitoring and the PDCCH monitoring configuration value for the SCG for span-based monitoring satisfies a threshold value.

In a seventh aspect, alone or in combination with one or more of the first through sixth aspects, the threshold value is a UE-reported PDCCH monitoring capability value for carrier aggregation for span-based monitoring, or a total quantity of downlink cells of the MCG and the SCG that are configured for the UE for span-based monitoring.

In an eighth aspect, alone or in combination with one or more of the first through seventh aspects, a PDCCH monitoring capability value for the MCG for slot-based monitoring, or a PDCCH monitoring capability value for the SCG for slot-based monitoring, is less than a UE-reported PDCCH monitoring capability value for carrier aggregation for slot-based monitoring, and a sum of the PDCCH monitoring capability value for the MCG for slot-based monitoring and the PDCCH monitoring capability value for the SCG for slot-based monitoring is greater than or equal to the UE-reported PDCCH monitoring capability value for carrier aggregation for slot-based monitoring.

In a ninth aspect, alone or in combination with one or more of the first through eighth aspects, a PDCCH monitoring capability value for the MCG for slot-based monitoring, or a PDCCH monitoring capability value for the SCG for slot-based monitoring, is selected from a set of values, and a sum of the PDCCH monitoring capability value for the MCG for slot-based monitoring and the PDCCH monitoring capability value for the SCG for slot-based monitoring is greater than or equal to a maximum quantity of downlink cells of the MCG or the SCG that can be configured for the UE for slot-based monitoring.

In a tenth aspect, alone or in combination with one or more of the first through ninth aspects, a PDCCH monitoring capability value for the MCG for span-based monitoring, or a PDCCH monitoring capability value for the SCG for span-based monitoring, is less than a UE-reported PDCCH monitoring capability value for carrier aggregation for span-based monitoring, and a sum of the PDCCH monitoring capability value for the MCG for span-based monitoring and the PDCCH monitoring capability value for the SCG for span-based monitoring is greater than or equal to the UE-reported PDCCH monitoring capability value for carrier aggregation for span-based monitoring.

In an eleventh aspect, alone or in combination with one or more of the first through tenth aspects, a PDCCH monitoring capability value for the MCG for span-based monitoring, or a PDCCH monitoring capability value for the SCG for span-based monitoring, is selected from a set of values, and a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for the UE for span-based monitoring.

In a twelfth aspect, alone or in combination with one or more of the first through eleventh aspects, a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring are received separately.

In a thirteenth aspect, alone or in combination with one or more of the first through twelfth aspects, a PDCCH monitoring capability value for the MCG for slot-based monitoring and a PDCCH monitoring capability value for the MCG for span-based monitoring are received together, and a PDCCH monitoring capability value for the SCG for slot-based monitoring and a PDCCH monitoring capability value for the SCG for span-based monitoring are received together.

In a fourteenth aspect, alone or in combination with one or more of the first through thirteenth aspects, a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring are received together.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: determining, for a master cell group (MCG) and a secondary cell group (SCG) used for a dual connectivity mode of the UE, physical downlink control channel (PDCCH) monitoring capability values for one or more of slot-based monitoring, span-based monitoring, or a combination of slot-based monitoring and span-based monitoring; and transmitting, to a base station, information indicating the PDCCH monitoring capability values that are determined.

Aspect 2: The method of Aspect 1, wherein the information indicates a PDCCH monitoring capability value for the MCG for slot-based monitoring, and a PDCCH monitoring capability value for the SCG for slot-based monitoring.

Aspect 3: The method of any of Aspects 1-2, wherein the information indicates a PDCCH monitoring capability value for the MCG for span-based monitoring, and a PDCCH monitoring capability value for the SCG for span-based monitoring.

Aspect 4: The method of any of Aspects 1-3, wherein the information indicates a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring.

Aspect 5: The method of any of Aspects 1-4, further comprising: receiving a PDCCH monitoring configuration value for the MCG for slot-based monitoring and a PDCCH monitoring configuration value for the SCG for slot-based monitoring, wherein a sum of the PDCCH monitoring configuration value for the MCG for slot-based monitoring and the PDCCH monitoring configuration value for the SCG for slot-based monitoring satisfies a threshold value.

Aspect 6: The method of Aspect 5, wherein the threshold value is a reported PDCCH monitoring capability value for carrier aggregation for slot-based monitoring, or a total quantity of downlink cells of the MCG and the SCG that are configured for slot-based monitoring.

Aspect 7: The method of any of Aspects 1-6, further comprising: receiving a PDCCH monitoring configuration value for the MCG for span-based monitoring and a PDCCH monitoring configuration value for the SCG for span-based monitoring, wherein a sum of the PDCCH monitoring configuration value for the MCG for span-based monitoring and the PDCCH monitoring configuration value for the SCG for span-based monitoring satisfies a threshold value.

Aspect 8: The method of Aspect 7, wherein the threshold value is a reported PDCCH monitoring capability value for carrier aggregation for span-based monitoring, or a total quantity of downlink cells of the MCG and the SCG that are configured for span-based monitoring.

Aspect 9: The method of any of Aspects 1-8, wherein a PDCCH monitoring capability value for the MCG for slot-based monitoring, or a PDCCH monitoring capability value for the SCG for slot-based monitoring, is less than a reported PDCCH monitoring capability value for carrier aggregation for slot-based monitoring, and wherein a sum of the PDCCH monitoring capability value for the MCG for slot-based monitoring and the PDCCH monitoring capability value for the SCG for slot-based monitoring is greater than or equal to the reported PDCCH monitoring capability value for carrier aggregation for slot-based monitoring.

Aspect 10: The method of any of Aspects 1-9, wherein a PDCCH monitoring capability value for the MCG for slot-based monitoring, or a PDCCH monitoring capability value for the SCG for slot-based monitoring, is selected from a set of values, and wherein a sum of the PDCCH monitoring capability value for the MCG for slot-based monitoring and the PDCCH monitoring capability value for the SCG for slot-based monitoring is greater than or equal to a maximum quantity of downlink cells of the MCG or the SCG that can be configured for slot-based monitoring.

Aspect 11: The method of any of Aspects 1-10, wherein a PDCCH monitoring capability value for the MCG for span-based monitoring, or a PDCCH monitoring capability value for the SCG for span-based monitoring, is less than a reported PDCCH monitoring capability value for carrier aggregation for span-based monitoring, and wherein a sum of the PDCCH monitoring capability value for the MCG for span-based monitoring and the PDCCH monitoring capability value for the SCG for span-based monitoring is greater than or equal to the reported PDCCH monitoring capability value for carrier aggregation for span-based monitoring.

Aspect 12: The method of any of Aspects 1-11, wherein a PDCCH monitoring capability value for the MCG for span-based monitoring, or a PDCCH monitoring capability value for the SCG for span-based monitoring, is selected from a set of values, and wherein a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for span-based monitoring.

Aspect 13: The method of any of Aspects 1-12, wherein a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring are transmitted separately.

Aspect 14: The method of any of Aspects 1-12, wherein a PDCCH monitoring capability value for the MCG for slot-based monitoring and a PDCCH monitoring capability value for the MCG for span-based monitoring are transmitted together, and a PDCCH monitoring capability value for the SCG for slot-based monitoring and a PDCCH monitoring capability value for the SCG for span-based monitoring are transmitted together.

Aspect 15: The method of any of Aspects 1-12, wherein a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring are transmitted together.

Aspect 16: The method of any of Aspects 1-15, further comprising: determining a distribution, of at least one of control channel elements or blind decodes, on a plurality of carriers of the MCG and a plurality of carriers of the SCG based at least in part on a determination of whether spans on the plurality of carriers of the MCG are aligned and a separate determination of whether spans on the plurality of carriers of the SCG are aligned.

Aspect 17: A method of wireless communication performed by a base station, comprising: receiving, from a user equipment (UE), information indicating physical downlink control channel (PDCCH) monitoring capability values, for a master cell group (MCG) and a secondary cell group (SCG) used for a dual connectivity mode of the UE, for one or more of slot-based monitoring, span-based monitoring, or a combination of slot-based monitoring and span-based monitoring; and transmitting, to the UE, PDCCH monitoring configuration values for the MCG and the SCG based at least in part on the PDCCH monitoring capability values.

Aspect 18: The method of Aspect 17, wherein the information indicates a PDCCH monitoring capability value for the MCG for slot-based monitoring, and a PDCCH monitoring capability value for the SCG for slot-based monitoring.

Aspect 19: The method of any of Aspects 17-18, wherein the information indicates a PDCCH monitoring capability value for the MCG for span-based monitoring, and a PDCCH monitoring capability value for the SCG for span-based monitoring.

Aspect 20: The method of any of Aspects 17-19, wherein the information indicates a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring.

Aspect 21: The method of any of Aspects 17-20, where the PDCCH monitoring configuration values include a PDCCH monitoring configuration value for the MCG for slot-based monitoring and a PDCCH monitoring configuration value for the SCG for slot-based monitoring, and wherein a sum of the PDCCH monitoring configuration value for the MCG for slot-based monitoring and the PDCCH monitoring configuration value for the SCG for slot-based monitoring satisfies a threshold value.

Aspect 22: The method of Aspect 21, wherein the threshold value is a UE-reported PDCCH monitoring capability value for carrier aggregation for slot-based monitoring, or a total quantity of downlink cells of the MCG and the SCG that are configured for the UE for slot-based monitoring.

Aspect 23: The method of any of Aspects 17-22, where the PDCCH monitoring configuration values include a PDCCH monitoring configuration value for the MCG for span-based monitoring and a PDCCH monitoring configuration value for the SCG for span-based monitoring, and wherein a sum of the PDCCH monitoring configuration value for the MCG for span-based monitoring and the PDCCH monitoring configuration value for the SCG for span-based monitoring satisfies a threshold value.

Aspect 24: The method of Aspect 23, wherein the threshold value is a UE-reported PDCCH monitoring capability value for carrier aggregation for span-based monitoring, or a total quantity of downlink cells of the MCG and the SCG that are configured for the UE for span-based monitoring.

Aspect 25: The method of any of Aspects 17-24, wherein a PDCCH monitoring capability value for the MCG for slot-based monitoring, or a PDCCH monitoring capability value for the SCG for slot-based monitoring, is less than a UE-reported PDCCH monitoring capability value for carrier aggregation for slot-based monitoring, and wherein a sum of the PDCCH monitoring capability value for the MCG for slot-based monitoring and the PDCCH monitoring capability value for the SCG for slot-based monitoring is greater than or equal to the UE-reported PDCCH monitoring capability value for carrier aggregation for slot-based monitoring.

Aspect 26: The method of any of Aspects 17-25, wherein a PDCCH monitoring capability value for the MCG for slot-based monitoring, or a PDCCH monitoring capability value for the SCG for slot-based monitoring, is selected from a set of values, and wherein a sum of the PDCCH monitoring capability value for the MCG for slot-based monitoring and the PDCCH monitoring capability value for the SCG for slot-based monitoring is greater than or equal to a maximum quantity of downlink cells of the MCG or the SCG that can be configured for the UE for slot-based monitoring.

Aspect 27: The method of any of Aspects 17-26, wherein a PDCCH monitoring capability value for the MCG for span-based monitoring, or a PDCCH monitoring capability value for the SCG for span-based monitoring, is less than a UE-reported PDCCH monitoring capability value for carrier aggregation for span-based monitoring, and wherein a sum of the PDCCH monitoring capability value for the MCG for span-based monitoring and the PDCCH monitoring capability value for the SCG for span-based monitoring is greater than or equal to the UE-reported PDCCH monitoring capability value for carrier aggregation for span-based monitoring.

Aspect 28: The method of any of Aspects 17-27, wherein a PDCCH monitoring capability value for the MCG for span-based monitoring, or a PDCCH monitoring capability value for the SCG for span-based monitoring, is selected from a set of values, and wherein a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for the UE for span-based monitoring.

Aspect 29: The method of any of Aspects 17-28, wherein a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring are received separately.

Aspect 30: The method of any of Aspects 17-28, wherein a PDCCH monitoring capability value for the MCG for slot-based monitoring and a PDCCH monitoring capability value for the MCG for span-based monitoring are received together, and a PDCCH monitoring capability value for the SCG for slot-based monitoring and a PDCCH monitoring capability value for the SCG for span-based monitoring are received together.

Aspect 31: The method of any of Aspects 17-28, wherein a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring are received together.

Aspect 32: An apparatus for wireless communication at a device, comprising a processor; memory coupled with the processor; and instructions stored in the memory and executable by the processor to cause the apparatus to perform the method of one or more of Aspects 1-16.

Aspect 33: A device for wireless communication, comprising a memory and one or more processors coupled to the memory, the one or more processors configured to perform the method of one or more of Aspects 1-16.

Aspect 34: An apparatus for wireless communication, comprising at least one means for performing the method of one or more of Aspects 1-16.

Aspect 35: A non-transitory computer-readable medium storing code for wireless communication, the code comprising instructions executable by a processor to perform the method of one or more of Aspects 1-16.

Aspect 36: A non-transitory computer-readable medium storing a set of instructions for wireless communication, the set of instructions comprising one or more instructions that, when executed by one or more processors of a device, cause the device to perform the method of one or more of Aspects 1-16.

Aspect 37: An apparatus for wireless communication at a device, comprising a processor; memory coupled with the processor; and instructions stored in the memory and executable by the processor to cause the apparatus to perform the method of one or more of Aspects 17-31.

Aspect 38: A device for wireless communication, comprising a memory and one or more processors coupled to the memory, the one or more processors configured to perform the method of one or more of Aspects 17-31.

Aspect 39: An apparatus for wireless communication, comprising at least one means for performing the method of one or more of Aspects 17-31.

Aspect 40: A non-transitory computer-readable medium storing code for wireless communication, the code comprising instructions executable by a processor to perform the method of one or more of Aspects 17-31.

Aspect 41: A non-transitory computer-readable medium storing a set of instructions for wireless communication, the set of instructions comprising one or more instructions that, when executed by one or more processors of a device, cause the device to perform the method of one or more of Aspects 17-31.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, for a master cell group (MCG) and a secondary cell group (SCG) used for a dual connectivity mode of the UE, information indicating physical downlink control channel (PDCCH) monitoring capability values for one or more of span-based monitoring or a combination of slot-based monitoring and span-based monitoring; and
   receiving PDCCH monitoring configuration values for the MCG and the SCG based at least in part on the PDCCH monitoring capability values,
      wherein one or more of:
         a sum of a PDCCH monitoring configuration value for the MCG for span-based monitoring and a PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring,
         a sum of a PDCCH monitoring capability value for the MCG for slot-based monitoring and a PDCCH monitoring capability value for the SCG for slot-based monitoring is greater than or equal to a reported PDCCH monitoring capability value for carrier aggregation for slot-based monitoring, or a maximum quantity of downlink cells of the MCG or the SCG that can be configured for slot-based monitoring,
         a sum of a PDCCH monitoring capability value for the MCG for span-based monitoring and a PDCCH monitoring capability value for the SCG for span-based monitoring is greater than or equal to the reported PDCCH monitoring capability value for carrier aggregation for span-based monitoring, or
         a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for span-based monitoring.

2. The method of claim 1, wherein all cells of the MCG and all cells of the SCG are configured for span-based monitoring, and
   wherein the PDCCH monitoring capability values include the PDCCH monitoring capability value for the MCG for span-based monitoring and the PDCCH monitoring capability value for the SCG for span-based monitoring.

3. The method of claim 1, wherein one or more cells of at least one of the MCG or the SCG are configured for slot-based monitoring and one or more cells of at least one of the MCG or the SCG are configured for span-based monitoring, and
   wherein the PDCCH monitoring capability values include the PDCCH monitoring capability value for the MCG for slot-based monitoring, the PDCCH monitoring capability value for the MCG for span-based monitoring, the PDCCH monitoring capability value for the SCG for slot-based monitoring, and the PDCCH monitoring capability value for the SCG for span-based monitoring.

4. The method of claim 1,
   wherein one or more cells of at least one of the MCG or the SCG are configured for slot-based monitoring and one or more cells of at least one of the MCG or the SCG are configured for span-based monitoring,
   wherein the PDCCH monitoring configuration values include a PDCCH monitoring configuration value for the MCG for slot-based monitoring, a PDCCH monitoring configuration value for the SCG for slot-based monitoring, the PDCCH monitoring configuration value for the MCG for span-based monitoring, and the PDCCH monitoring configuration value for the SCG for span-based monitoring,
   wherein a sum of the PDCCH monitoring configuration value for the MCG for slot-based monitoring and the PDCCH monitoring configuration value for the SCG for slot-based monitoring is less than or equal to the reported PDCCH monitoring capability value for carrier aggregation for slot-based monitoring, or a total quantity of downlink cells of the MCG and the SCG that are configured for slot-based monitoring, and
   wherein the sum of the PDCCH monitoring configuration value for the MCG for span-based monitoring and the PDCCH monitoring configuration value for the SCG for span-based monitoring is less than or equal to the reported PDCCH monitoring capability value for carrier aggregation for span-based monitoring, or the total quantity of downlink cells of the MCG and the SCG that are configured for span-based monitoring.

5. The method of claim 1,
   wherein all cells of the MCG and all cells of the SCG are configured for span-based monitoring,
   wherein the PDCCH monitoring configuration values include the PDCCH monitoring configuration value for the MCG for span-based monitoring and the PDCCH monitoring configuration value for the SCG for span-based monitoring,
   wherein the sum of the PDCCH monitoring configuration value for the MCG for span-based monitoring and the PDCCH monitoring configuration value for the SCG for span-based monitoring is less than or equal to the reported PDCCH monitoring capability value for carrier aggregation for span-based monitoring, or the total quantity of downlink cells of the MCG and the SCG that are configured for span-based monitoring.

6. The method of claim 1,
   wherein the PDCCH monitoring capability value for the MCG for slot-based monitoring, or the PDCCH monitoring capability value for the SCG for slot-based monitoring, is less than the reported PDCCH monitoring capability value for carrier aggregation for slot-based monitoring, and
   wherein the sum of the PDCCH monitoring capability value for the MCG for slot-based monitoring and the PDCCH monitoring capability value for the SCG for slot-based monitoring is greater than or equal to the reported PDCCH monitoring capability value for carrier aggregation for slot-based monitoring.

7. The method of claim 1,
   wherein the PDCCH monitoring capability value for the MCG for slot-based monitoring, or the PDCCH monitoring capability value for the SCG for slot-based monitoring, is selected from a set of values, and
   wherein the sum of the PDCCH monitoring capability value for the MCG for slot-based monitoring and the PDCCH monitoring capability value for the SCG for slot-based monitoring is greater than or equal to the maximum quantity of downlink cells of the MCG or the SCG that can be configured for slot-based monitoring.

8. The method of claim 1,
wherein the PDCCH monitoring capability value for the MCG for span-based monitoring, or the PDCCH monitoring capability value for the SCG for span-based monitoring, is less than the reported PDCCH monitoring capability value for carrier aggregation for span-based monitoring, and
wherein the sum of the PDCCH monitoring capability value for the MCG for span-based monitoring and the PDCCH monitoring capability value for the SCG for span-based monitoring is greater than or equal to the reported PDCCH monitoring capability value for carrier aggregation for span-based monitoring.

9. The method of claim 1,
wherein the PDCCH monitoring capability value for the MCG for span-based monitoring, or the PDCCH monitoring capability value for the SCG for span-based monitoring, is selected from a set of values, and
wherein the sum of the PDCCH monitoring capability value for the MCG for span-based monitoring and the PDCCH monitoring capability value for the SCG for span-based monitoring is greater than or equal to the maximum quantity of downlink cells of the MCG or the SCG that can be configured for span-based monitoring.

10. A method of wireless communication performed by a network entity, comprising:
receiving, from a user equipment (UE), information indicating physical downlink control channel (PDCCH) monitoring capability values, for a master cell group (MCG) and a secondary cell group (SCG) used for a dual connectivity mode of the UE, for one or more of span-based monitoring or a combination of slot-based monitoring and span-based monitoring; and
transmitting, to the UE, PDCCH monitoring configuration values for the MCG and the SCG based at least in part on the PDCCH monitoring capability values,
wherein one or more of:
a sum of a PDCCH monitoring configuration value for the MCG for span-based monitoring and a PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring,
a sum of a PDCCH monitoring capability value for the MCG for slot-based monitoring and a PDCCH monitoring capability value for the SCG for slot-based monitoring is greater than or equal to a reported PDCCH monitoring capability value for carrier aggregation for slot-based monitoring, or a maximum quantity of downlink cells of the MCG or the SCG that can be configured for slot-based monitoring,
a sum of a PDCCH monitoring capability value for the MCG for span-based monitoring and a PDCCH monitoring capability value for the SCG for span-based monitoring is greater than or equal to the reported PDCCH monitoring capability value for carrier aggregation for span-based monitoring, or
a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for span-based monitoring.

11. The method of claim 10, wherein all cells of the MCG and all cells of the SCG are configured for span-based monitoring, and
wherein the PDCCH monitoring capability values include the PDCCH monitoring capability value for the MCG for span-based monitoring and the PDCCH monitoring capability value for the SCG for span-based monitoring.

12. The method of claim 10, wherein one or more cells of at least one of the MCG or the SCG are configured for slot-based monitoring and one or more cells of at least one of the MCG or the SCG are configured for span-based monitoring, and
wherein the PDCCH monitoring capability values include the PDCCH monitoring capability value for the MCG for slot-based monitoring, the PDCCH monitoring capability value for the MCG for span-based monitoring, the PDCCH monitoring capability value for the SCG for slot-based monitoring, and the PDCCH monitoring capability value for the SCG for span-based monitoring.

13. The method of claim 10,
wherein one or more cells of at least one of the MCG or the SCG are configured for slot-based monitoring and one or more cells of at least one of the MCG or the SCG are configured for span-based monitoring, and
wherein the PDCCH monitoring configuration values include a PDCCH monitoring configuration value for the MCG for slot-based monitoring, a PDCCH monitoring configuration value for the SCG for slot-based monitoring, the PDCCH monitoring configuration value for the MCG for span-based monitoring, and the PDCCH monitoring configuration value for the SCG for span-based monitoring,
wherein a sum of the PDCCH monitoring configuration value for the MCG for slot-based monitoring and the PDCCH monitoring configuration value for the SCG for slot-based monitoring is less than or equal to the reported PDCCH monitoring capability value for carrier aggregation for slot-based monitoring, or a total quantity of downlink cells of the MCG and the SCG that are configured for slot-based monitoring, and
wherein the sum of the PDCCH monitoring configuration value for the MCG for span-based monitoring and the PDCCH monitoring configuration value for the SCG for span-based monitoring is less than or equal to the reported PDCCH monitoring capability value for carrier aggregation for span-based monitoring, or the total quantity of downlink cells of the MCG and the SCG that are configured for span-based monitoring.

14. The method of claim 10,
wherein all cells of the MCG and all cells of the SCG are configured for span-based monitoring, and
wherein the PDCCH monitoring configuration values include the PDCCH monitoring configuration value for the MCG for span-based monitoring and the PDCCH monitoring configuration value for the SCG for span-based monitoring,
wherein the sum of the PDCCH monitoring configuration value for the MCG for span-based monitoring and the PDCCH monitoring configuration value for the SCG for span-based monitoring is less than or equal to the reported PDCCH monitoring capability value for carrier aggregation for span-based monitoring, or the total quantity of downlink cells of the MCG and the SCG that are configured for span-based monitoring.

15. The method of claim 10,
wherein the PDCCH monitoring capability value for the MCG for slot-based monitoring, or the PDCCH monitoring capability value for the SCG for slot-based monitoring, is less than the reported PDCCH monitoring capability value for carrier aggregation for slot-based monitoring, and
wherein the sum of the PDCCH monitoring capability value for the MCG for slot-based monitoring and the PDCCH monitoring capability value for the SCG for slot-based monitoring is greater than or equal to the reported PDCCH monitoring capability value for carrier aggregation for slot-based monitoring.

16. The method of claim 10,
wherein the PDCCH monitoring capability value for the MCG for slot-based monitoring, or the PDCCH monitoring capability value for the SCG for slot-based monitoring, is selected from a set of values, and
wherein the sum of the PDCCH monitoring capability value for the MCG for slot-based monitoring and the PDCCH monitoring capability value for the SCG for slot-based monitoring is greater than or equal to the maximum quantity of downlink cells of the MCG or the SCG that can be configured for slot-based monitoring.

17. The method of claim 10,
wherein the PDCCH monitoring capability value for the MCG for span-based monitoring, or the PDCCH monitoring capability value for the SCG for span-based monitoring, is less than the reported PDCCH monitoring capability value for carrier aggregation for span-based monitoring, and
wherein the sum of the PDCCH monitoring capability value for the MCG for span-based monitoring and the PDCCH monitoring capability value for the SCG for span-based monitoring is greater than or equal to the reported PDCCH monitoring capability value for carrier aggregation for span-based monitoring.

18. The method of claim 10,
wherein the PDCCH monitoring capability value for the MCG for span-based monitoring, or the PDCCH monitoring capability value for the SCG for span-based monitoring, is selected from a set of values, and
wherein the sum of the PDCCH monitoring capability value for the MCG for span-based monitoring and the PDCCH monitoring capability value for the SCG for span-based monitoring is greater than or equal to the maximum quantity of downlink cells of the MCG or the SCG that can be configured for span-based monitoring.

19. A user equipment (UE) for wireless communication, comprising:
a memory; and
one or more processors, coupled to the memory, configured to:
  transmit, for a master cell group (MCG) and a secondary cell group (SCG) used for a dual connectivity mode of the UE, information indicating physical downlink control channel (PDCCH) monitoring capability values for one or more of span-based monitoring or a combination of slot-based monitoring and span-based monitoring; and
  receive PDCCH monitoring configuration values for the MCG and the SCG based at least in part on the PDCCH monitoring capability values,
  wherein one or more of:
    a sum of a PDCCH monitoring configuration value for the MCG for span-based monitoring and a PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring,
    a sum of a PDCCH monitoring capability value for the MCG for slot-based monitoring and a PDCCH monitoring capability value for the SCG for slot-based monitoring is greater than or equal to a reported PDCCH monitoring capability value for carrier aggregation for slot-based monitoring, or a maximum quantity of downlink cells of the MCG or the SCG that can be configured for slot-based monitoring,
    a sum of a PDCCH monitoring capability value for the MCG for span-based monitoring and a PDCCH monitoring capability value for the SCG for span-based monitoring is greater than or equal to the reported PDCCH monitoring capability value for carrier aggregation for span-based monitoring, or
    a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for span-based monitoring.

20. The UE of claim 19, wherein one or more cells of at least one of the MCG or the SCG are configured for slot-based monitoring and one or more cells of at least one of the MCG or the SCG are configured for span-based monitoring, and
wherein the PDCCH monitoring configuration values include a PDCCH monitoring configuration value for the MCG for slot-based monitoring, a PDCCH monitoring configuration value for the SCG for slot-based monitoring, the PDCCH monitoring configuration value for the MCG for span-based monitoring, and the PDCCH monitoring configuration value for the SCG for span-based monitoring, and
wherein a sum of the PDCCH monitoring configuration value for the MCG for slot-based monitoring and the PDCCH monitoring configuration value for the SCG for slot-based monitoring is less than or equal to the reported PDCCH monitoring capability value for carrier aggregation for slot-based monitoring, or a total quantity of downlink cells of the MCG and the SCG that are configured for slot-based monitoring, and
wherein the sum of the PDCCH monitoring configuration value for the MCG for span-based monitoring and the PDCCH monitoring configuration value for the SCG for span-based monitoring is less than or equal to the reported PDCCH monitoring capability value for carrier aggregation for span-based monitoring, or the total quantity of downlink cells of the MCG and the SCG that are configured for span-based monitoring.

21. The UE of claim 19,
wherein all cells of the MCG and all cells of the SCG are configured for span-based monitoring,
wherein the PDCCH monitoring configuration values include the PDCCH monitoring configuration value for the MCG for span-based monitoring and the PDCCH monitoring configuration value for the SCG for span-based monitoring, wherein the of the PDCCH monitoring configuration value for the MCG for span-based monitoring and the PDCCH monitoring configuration value for the SCG for span-based monitoring is less than or equal to the reported PDCCH monitoring capability value for carrier aggregation for span-based monitoring, or the total quantity of downlink cells of the MCG and the SCG that are configured for span-based monitoring.

22. The UE of claim 19, wherein the PDCCH monitoring capability value for the MCG for slot-based monitoring, or the PDCCH monitoring capability value for the SCG for slot-based monitoring, is less than the reported PDCCH monitoring capability value for carrier aggregation for slot-based monitoring, and wherein the sum of the PDCCH monitoring capability value for the MCG for slot-based monitoring and the PDCCH monitoring capability value for the SCG for slot-based monitoring is greater than or equal to the reported PDCCH monitoring capability value for carrier aggregation for slot-based monitoring.

23. The UE of claim 19, wherein the PDCCH monitoring capability value for the MCG for slot-based monitoring, or the PDCCH monitoring capability value for the SCG for slot-based monitoring, is selected from a set of values, and wherein the sum of the PDCCH monitoring capability value for the MCG for slot-based monitoring and the PDCCH monitoring capability value for the SCG for slot-based monitoring is greater than or equal to the maximum quantity of downlink cells of the MCG or the SCG that can be configured for slot-based monitoring.

24. The UE of claim 19, wherein the PDCCH monitoring capability value for the MCG for span-based monitoring, or the PDCCH monitoring capability value for the SCG for span-based monitoring, is less than the reported PDCCH monitoring capability value for carrier aggregation for span-based monitoring, and wherein the sum of the PDCCH monitoring capability value for the MCG for span-based monitoring and the PDCCH monitoring capability value for the SCG for span-based monitoring is greater than or equal to the reported PDCCH monitoring capability value for carrier aggregation for span-based monitoring.

25. The UE of claim 19, wherein the PDCCH monitoring capability value for the MCG for span-based monitoring, or the PDCCH monitoring capability value for the SCG for span-based monitoring, is selected from a set of values, and wherein the sum of the PDCCH monitoring capability value for the MCG for span-based monitoring and the PDCCH monitoring capability value for the SCG for span-based monitoring is greater than or equal to the maximum quantity of downlink cells of the MCG or the SCG that can be configured for span-based monitoring.

26. The UE of claim 19, wherein, to transmit the information, the one or more processors are configured to:
transmit, to a base station, the information, and wherein, to receive the PDCCH monitoring configuration values, the one or more processors are configured to:
receive, from the base station, the PDCCH monitoring configuration values.

27. The UE of claim 19, wherein the PDCCH monitoring capability values indicate one or more of:
a scaling value that the UE is to apply to an indicated PDCCH monitoring configuration,
a quantity of monitored PDCCH candidates per slot or span, or
a quantity of non-overlapped control channel elements (CCEs) per slot or span.

28. The UE of claim 27,
wherein the PDCCH monitoring capability values indicate the scaling value that the UE is to apply to the indicated PDCCH monitoring configuration,
wherein the indicated PDCCH monitoring configuration indicates the quantity of monitored PDCCH candidates per slot or span, and
wherein the quantity of monitored PDCCH candidates per slot or span is a number of blind decodes per slot or span.

29. The UE of claim 19, wherein the sum of the PDCCH monitoring configuration value for the MCG for span-based monitoring and the PDCCH monitoring configuration value for the SCG for span-based monitoring is less than or equal to the reported PDCCH monitoring capability value for carrier aggregation for span-based monitoring, or the total quantity of downlink cells of the MCG and the SCG that are configured for span-based monitoring.

30. A network entity for wireless communication, comprising:
a memory; and
one or more processors, coupled to the memory, configured to:
receive, from a user equipment (UE), information indicating physical downlink control channel (PDCCH) monitoring capability values, for a master cell group (MCG) and a secondary cell group (SCG) used for a dual connectivity mode of the UE, for one or more of span-based monitoring or a combination of slot-based monitoring and span-based monitoring; and
transmit, to the UE, PDCCH monitoring configuration values for the MCG and the SCG based at least in part on the PDCCH monitoring capability values,
wherein one or more of:
a sum of a PDCCH monitoring configuration value for the MCG for span-based monitoring and a PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring,
a sum of a PDCCH monitoring capability value for the MCG for slot-based monitoring and a PDCCH monitoring capability value for the SCG for slot-based monitoring is greater than or equal to a reported PDCCH monitoring capability value for carrier aggregation for slot-based monitoring, or a maximum quantity of downlink cells of the MCG or the SCG that can be configured for slot-based monitoring,
a sum of a PDCCH monitoring capability value for the MCG for span-based monitoring and a PDCCH monitoring capability value for the SCG for span-based monitoring is greater than or equal to the reported PDCCH monitoring capability value for carrier aggregation for span-based monitoring, or a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for span-based monitoring.

31. The network entity of claim 30,
wherein all cells of the MCG and all cells of the SCG are configured for span-based monitoring, and
wherein the PDCCH monitoring capability values include the PDCCH monitoring capability value for the MCG for span-based monitoring and the PDCCH monitoring capability value for the SCG for span-based monitoring.

32. The network entity of claim 30,
wherein one or more cells of at least one of the MCG or the SCG are configured for slot-based monitoring and one or more cells of at least one of the MCG or the SCG are configured for span-based monitoring, and
wherein the PDCCH monitoring capability values include the PDCCH monitoring capability value for the MCG for slot-based monitoring, the PDCCH monitoring capability value for the MCG for span-based monitoring, the PDCCH monitoring capability value for the SCG for slot-based monitoring, and the PDCCH monitoring capability value for the SCG for span-based monitoring.

33. The network entity of claim 30,
wherein one or more cells of at least one of the MCG or the SCG are configured for slot-based monitoring and one or more cells of at least one of the MCG or the SCG are configured for span-based monitoring,
wherein the PDCCH monitoring configuration values include a PDCCH monitoring configuration value for the MCG for slot-based monitoring, a PDCCH monitoring configuration value for the SCG for slot-based monitoring, the PDCCH monitoring configuration value for the MCG for span-based monitoring, and the PDCCH monitoring configuration value for the SCG for span-based monitoring,
wherein the sum of the PDCCH monitoring configuration value for the MCG for slot-based monitoring and the PDCCH monitoring configuration value for the SCG for slot-based monitoring is less than or equal to the reported PDCCH monitoring capability value for carrier aggregation for slot-based monitoring, or a total quantity of downlink cells of the MCG and the SCG that are configured for slot-based monitoring, and
wherein the sum of the PDCCH monitoring configuration value for the MCG for span-based monitoring and the PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring.

34. The network entity of claim 30,
wherein all cells of the MCG and all cells of the SCG are configured for span-based monitoring, and
wherein the PDCCH monitoring configuration values include the PDCCH monitoring configuration value for the MCG for span-based monitoring and a PDCCH monitoring configuration value for the SCG for span-based monitoring,
wherein the sum of the PDCCH monitoring configuration value for the MCG for span-based monitoring and the PDCCH monitoring configuration value for the SCG for span-based monitoring is less than or equal to the reported PDCCH monitoring capability value for carrier aggregation for span-based monitoring, or the total quantity of downlink cells of the MCG and the SCG that are configured for span-based monitoring.

35. A method of wireless communication performed by a user equipment (UE), comprising:
transmitting, for a master cell group (MCG) and a secondary cell group (SCG) used for a dual connectivity mode of the UE, information indicating physical downlink control channel (PDCCH) monitoring capability values for one or more of slot-based monitoring where all carriers of the MCG and the SCG are configured with a first type of PDCCHs, span-based monitoring where all carriers of the MCG and the SCG are configured with a second type of PDCCHs, or a combination of slot-based monitoring and span-based monitoring where one or more carriers of at least one of the MCG or the SCG are configured with the first type of PDCCHs and one or more carriers of at least one of the MCG or the SCG are configured with the second type of PDCCHs; and
receiving PDCCH monitoring configuration values for the MCG and the SCG based at least in part on the PDCCH monitoring capability values.

36. The method of claim 35, wherein all cells of the MCG and all cells of the SCG are configured for span-based monitoring, and
wherein the information indicates a PDCCH monitoring capability value for the MCG for span-based monitoring, and a PDCCH monitoring capability value for the SCG for span-based monitoring.

37. The method of claim 35, wherein one or more cells of at least one of the MCG or the SCG are configured for slot-based monitoring and one or more cells of at least one of the MCG or the SCG are configured for span-based monitoring, and
wherein the information indicates a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring.

38. The method of claim 35, wherein one or more cells of at least one of the MCG or the SCG are configured for slot-based monitoring and one or more cells of at least one of the MCG or the SCG are configured for span-based monitoring, and
wherein receiving the PDCCH monitoring configuration values comprises:
receiving a PDCCH monitoring configuration value for the MCG for slot-based monitoring, a PDCCH monitoring configuration value for the SCG for slot-based monitoring, a PDCCH monitoring configuration value for the MCG for span-based monitoring, and a PDCCH monitoring configuration value for the SCG for span-based monitoring,
wherein a sum of the PDCCH monitoring configuration value for the MCG for slot-based monitoring and the PDCCH monitoring configuration value for the SCG for slot-based monitoring is less than or equal to a reported PDCCH monitoring capability value for carrier aggregation for slot-based monitoring, or a total quantity of downlink cells of the MCG and the SCG that are configured for slot-based monitoring, and
    wherein a sum of the PDCCH monitoring configuration value for the MCG for span-based monitoring and the PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring.

39. The method of claim 35, wherein all cells of the MCG and all cells of the SCG are configured for span-based monitoring, and
    wherein receiving the PDCCH monitoring configuration values comprises:
        receiving a PDCCH monitoring configuration value for the MCG for span-based monitoring and a PDCCH monitoring configuration value for the SCG for span-based monitoring,
            wherein a sum of the PDCCH monitoring configuration value for the MCG for span-based monitoring and the PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring.

40. The method of claim 35, wherein a PDCCH monitoring capability value for the MCG for slot-based monitoring, or a PDCCH monitoring capability value for the SCG for slot-based monitoring, is less than a reported PDCCH monitoring capability value for carrier aggregation for slot-based monitoring, and
    wherein a sum of the PDCCH monitoring capability value for the MCG for slot-based monitoring and the PDCCH monitoring capability value for the SCG for slot-based monitoring is greater than or equal to the reported PDCCH monitoring capability value for carrier aggregation for slot-based monitoring.

41. The method of claim 35, wherein a PDCCH monitoring capability value for the MCG for slot-based monitoring, or a PDCCH monitoring capability value for the SCG for slot-based monitoring, is selected from a set of values, and
    wherein a sum of the PDCCH monitoring capability value for the MCG for slot-based monitoring and the PDCCH monitoring capability value for the SCG for slot-based monitoring is greater than or equal to a maximum quantity of downlink cells of the MCG or the SCG that can be configured for slot-based monitoring.

42. The method of claim 35, wherein a PDCCH monitoring capability value for the MCG for span-based monitoring, or a PDCCH monitoring capability value for the SCG for span-based monitoring, is less than a reported PDCCH monitoring capability value for carrier aggregation for span-based monitoring, and
    wherein a sum of the PDCCH monitoring capability value for the MCG for span-based monitoring and the PDCCH monitoring capability value for the SCG for span-based monitoring is greater than or equal to the reported PDCCH monitoring capability value for carrier aggregation for span-based monitoring.

43. The method of claim 35, wherein a PDCCH monitoring capability value for the MCG for span-based monitoring, or a PDCCH monitoring capability value for the SCG for span-based monitoring, is selected from a set of values, and
    wherein a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for span-based monitoring.

44. A method of wireless communication performed by a network entity, comprising:
    receiving, from a user equipment (UE), information indicating physical downlink control channel (PDCCH) monitoring capability values, for a master cell group (MCG) and a secondary cell group (SCG) used for a dual connectivity mode of the UE, for one or more of slot-based monitoring where all carriers of the MCG and the SCG are configured with a first type of PDCCHs, span-based monitoring where all carriers of the MCG and the SCG are configured with a second type of PDCCHs, or a combination of slot-based monitoring and span-based monitoring where one or more carriers of at least one of the MCG or the SCG are configured with the first type of PDCCHs and one or more carriers of at least one of the MCG or the SCG are configured with the second type of PDCCHs; and
    transmitting, to the UE, PDCCH monitoring configuration values for the MCG and the SCG based at least in part on the PDCCH monitoring capability values.

45. The method of claim 44, wherein all cells of the MCG and all cells of the SCG are configured for span-based monitoring, and
    wherein the information indicates a PDCCH monitoring capability value for the MCG for span-based monitoring, and a PDCCH monitoring capability value for the SCG for span-based monitoring.

46. The method of claim 44, wherein one or more cells of at least one of the MCG or the SCG are configured for slot-based monitoring and one or more cells of at least one of the MCG or the SCG are configured for span-based monitoring, and
    wherein the information indicates a PDCCH monitoring capability value for the MCG for slot-based monitoring, a PDCCH monitoring capability value for the MCG for span-based monitoring, a PDCCH monitoring capability value for the SCG for slot-based monitoring, and a PDCCH monitoring capability value for the SCG for span-based monitoring.

47. The method of claim 44, wherein one or more cells of at least one of the MCG or the SCG are configured for slot-based monitoring and one or more cells of at least one of the MCG or the SCG are configured for span-based monitoring, and
    wherein transmitting the PDCCH monitoring configuration values comprises:
        transmitting a PDCCH monitoring configuration value for the MCG for slot-based monitoring, a PDCCH monitoring configuration value for the SCG for slot-based monitoring, a PDCCH monitoring configuration value for the MCG for span-based monitoring, and a PDCCH monitoring configuration value for the SCG for span-based monitoring,
            wherein a sum of the PDCCH monitoring configuration value for the MCG for slot-based monitoring and the PDCCH monitoring configuration value for the SCG for slot-based monitoring is less than or equal to a reported PDCCH monitoring capability value for carrier aggregation for slot-based monitoring, or a total quantity of downlink cells of the MCG and the SCG that are configured for slot-based monitoring, and wherein a sum of the PDCCH monitoring configuration value for the MCG for span-based monitoring and the PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring.

48. A user equipment (UE) for wireless communication, comprising:
a memory; and
one or more processors, coupled to the memory, configured to:
transmit, for a master cell group (MCG) and a secondary cell group (SCG) used for a dual connectivity mode of the UE, information indicating physical downlink control channel (PDCCH) monitoring capability values for one or more of slot-based monitoring where all carriers of the MCG and the SCG are configured with a first type of PDCCHs, span-based monitoring where all carriers of the MCG and the SCG are configured with a second type of PDCCHs, or a combination of slot-based monitoring and span-based monitoring where one or more carriers of at least one of the MCG or the SCG are configured with the first type of PDCCHs and one or more carriers of at least one of the MCG or the SCG are configured with the second type of PDCCHs; and
receive PDCCH monitoring configuration values for the MCG and the SCG based at least in part on the PDCCH monitoring capability values.

49. The UE of claim 48, wherein one or more cells of at least one of the MCG or the SCG are configured for slot-based monitoring and one or more cells of at least one of the MCG or the SCG are configured for span-based monitoring, and
wherein the one or more processors, to receive the PDCCH monitoring configuration values, are configured to:
receive a PDCCH monitoring configuration value for the MCG for slot-based monitoring, a PDCCH monitoring configuration value for the SCG for slot-based monitoring, a PDCCH monitoring configuration value for the MCG for span-based monitoring, and a PDCCH monitoring configuration value for the SCG for span-based monitoring,
wherein a sum of the PDCCH monitoring configuration value for the MCG for slot-based monitoring and the PDCCH monitoring configuration value for the SCG for slot-based monitoring is less than or equal to a reported PDCCH monitoring capability value for carrier aggregation for slot-based monitoring, or a total quantity of downlink cells of the MCG and the SCG that are configured for slot-based monitoring, and
wherein a sum of the PDCCH monitoring configuration value for the MCG for span-based monitoring and the PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring.

50. The UE of claim 48, wherein all cells of the MCG and all cells of the SCG are configured for span-based monitoring, and
wherein the one or more processors, to receive the PDCCH monitoring configuration values, are configured to:
receive a PDCCH monitoring configuration value for the MCG for span-based monitoring and a PDCCH monitoring configuration value for the SCG for span-based monitoring,
wherein a sum of the PDCCH monitoring configuration value for the MCG for span-based monitoring and the PDCCH monitoring configuration value for the SCG for span-based monitoring is less than or equal to a reported PDCCH monitoring capability value for carrier aggregation for span-based monitoring, or a total quantity of downlink cells of the MCG and the SCG that are configured for span-based monitoring.

51. The UE of claim 48, wherein a PDCCH monitoring capability value for the MCG for slot-based monitoring, or a PDCCH monitoring capability value for the SCG for slot-based monitoring, is less than a reported PDCCH monitoring capability value for carrier aggregation for slot-based monitoring, and
wherein a sum of the PDCCH monitoring capability value for the MCG for slot-based monitoring and the PDCCH monitoring capability value for the SCG for slot-based monitoring is greater than or equal to the reported PDCCH monitoring capability value for carrier aggregation for slot-based monitoring.

52. The UE of claim 48, wherein a PDCCH monitoring capability value for the MCG for slot-based monitoring, or a PDCCH monitoring capability value for the SCG for slot-based monitoring, is selected from a set of values, and
wherein a sum of the PDCCH monitoring capability value for the MCG for slot-based monitoring and the PDCCH monitoring capability value for the SCG for slot-based monitoring is greater than or equal to a maximum quantity of downlink cells of the MCG or the SCG that can be configured for slot-based monitoring.

53. The UE of claim 48, wherein a PDCCH monitoring capability value for the MCG for span-based monitoring, or a PDCCH monitoring capability value for the SCG for span-based monitoring, is less than a reported PDCCH monitoring capability value for carrier aggregation for span-based monitoring, and
wherein a sum of the PDCCH monitoring capability value for the MCG for span-based monitoring and the PDCCH monitoring capability value for the SCG for span-based monitoring is greater than or equal to the reported PDCCH monitoring capability value for carrier aggregation for span-based monitoring.

54. The UE of claim 48, wherein a PDCCH monitoring capability value for the MCG for span-based monitoring, or a PDCCH monitoring capability value for the SCG for span-based monitoring, is selected from a set of values, and
wherein a sum of the PDCCH monitoring capability value for the MCG for span-based monitoring and the PDCCH monitoring capability value for the SCG for span-based monitoring is greater than or equal to a maximum quantity of downlink cells of the MCG or the SCG that can be configured for span-based monitoring.

55. A network entity for wireless communication, comprising:
a memory; and
one or more processors, coupled to the memory, configured to:
receive, from a user equipment (UE), information indicating physical downlink control channel (PDCCH) monitoring capability values, for a master cell group (MCG) and a secondary cell group (SCG) used for a dual connectivity mode of the UE, for one or more of slot-based monitoring where all carriers of the MCG and the SCG are configured with a first type of PDCCHs, span-based monitoring where all carriers of the MCG and the SCG are configured with a second type of PDCCHs, or a combination of slot-based monitoring and span-based monitoring where one or more carriers of at least one of the MCG or the SCG are configured with the first type of PDCCHs and one or more carriers of at least one of the MCG or the SCG are configured with the second type of PDCCHs; and
transmit, to the UE, PDCCH monitoring configuration values for the MCG and the SCG based at least in part on the PDCCH monitoring capability values.

56. The network entity of claim 55, wherein all cells of the MCG and all cells of the SCG are configured for span-based monitoring, and
wherein the information indicates a PDCCH monitoring capability value for the MCG for span-based monitoring, and a PDCCH monitoring capability value for the SCG for span-based monitoring.

* * * * *